(12) United States Patent
Nakazawa

(10) Patent No.: US 12,326,546 B2
(45) Date of Patent: Jun. 10, 2025

(54) IMAGING OPTICAL SYSTEM, IMAGE CAPTURE DEVICE, AND CAMERA SYSTEM

(71) Applicant: Panasonic Intellectual Property Management Co., Ltd., Osaka (JP)

(72) Inventor: Genki Nakazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 196 days.

(21) Appl. No.: 18/202,560

(22) Filed: May 26, 2023

(65) Prior Publication Data
US 2023/0384569 A1 Nov. 30, 2023

(30) Foreign Application Priority Data

May 31, 2022 (JP) .................. 2022-088149

(51) Int. Cl.
| | | |
|---|---|---|
| *G02B 13/18* | (2006.01) | |
| *G02B 7/02* | (2021.01) | |
| *G02B 7/14* | (2021.01) | |
| *G02B 9/28* | (2006.01) | |
| *G03B 13/34* | (2021.01) | |
| *G03B 17/14* | (2021.01) | |
| *H04N 23/55* | (2023.01) | |

(52) U.S. Cl.
CPC ............ *G02B 13/18* (2013.01); *G02B 7/021* (2013.01); *G02B 7/14* (2013.01); *G02B 9/28* (2013.01); *G03B 13/34* (2013.01); *G03B 17/14* (2013.01); *H04N 23/55* (2023.01)

(58) Field of Classification Search
CPC .......... G02B 13/18; G02B 7/021; G02B 7/14; G02B 9/28; G03B 13/34; G03B 17/14; H04N 23/55
See application file for complete search history.

(56) References Cited

U.S. PATENT DOCUMENTS

2016/0341938 A1 11/2016 Sun
2022/0236520 A1* 7/2022 Yokoyama ........... H04N 13/239

FOREIGN PATENT DOCUMENTS

JP 2016-218170 12/2016

* cited by examiner

*Primary Examiner* — Nicholas G Giles
(74) *Attorney, Agent, or Firm* — Wenderoth, Lind & Ponack, L.L.P.

(57) ABSTRACT

An imaging optical system consists of a first lens group having positive power, a second lens group having power; and a third lens group having power. The first lens group and the third lens group are immobile along an optical axis and the second lens group moves along the optical axis while the imaging optical system is focusing. The first lens group consists of: a sub-lens group G1A; an aperture stop; and a sub-lens group G1B. The sub-lens group G1A includes: a meniscus lens L1A1 having positive power and having a convex surface facing the object; a meniscus lens L1A2 having negative power and having a convex surface facing the object; and a meniscus lens L1A3 having negative power and having a convex surface facing the object.

10 Claims, 10 Drawing Sheets

IMAGING OPTICAL SYSTEM, IMAGE CAPTURE DEVICE, AND CAMERA SYSTEM

CROSS-REFERENCE TO RELATED APPLICATIONS

The present application is based upon, and claims the benefit of priority to, Japanese Patent Application No. 2022-088149, filed on May 31, 2022, the entire contents of which are hereby incorporated by reference.

TECHNICAL FIELD

The present disclosure generally relates to an imaging optical system, an image capture device, and a camera system. More particularly, the present disclosure relates to an imaging optical system with the ability to compensate for various types of aberrations sufficiently, and also relates to an image capture device and camera system, each including such an imaging optical system.

BACKGROUND ART

JP 2016-218170 A discloses an imaging optical system including a first lens group G1 having negative power, a stop St, and a second lens group G2 having positive power, which are arranged in this order such that the first lens group G1 is located closer to the object than any other component of the imaging optical system. The first lens group G1 includes a lens group G1a consisting of one positive lens and three negative lenses and having negative power overall and a lens group G1b including two positive lenses and one or more negative lenses and having positive power overall. The one positive lens and the three negative lenses are arranged in this order such that the positive lens is located closer to the object than any other lens of the lens group G1a. The two positive lenses and the one or more negative lenses are arranged in this order such that the one of the two positive lenses is located closer to the object than any other lens of the lens group G1b. The second lens group G2 includes: a bonded lens C2a formed by bonding together a positive lens, a negative lens, and a biconvex positive lens in this order such that the positive lens is located closest to the object; and a bonded lens C2b formed by bonding together a biconvex positive lens and a negative lens in this order such that the biconvex positive lens is located closer to the object than the negative lens is. The imaging optical system performs focusing by moving only the second lens group G2.

SUMMARY

The present disclosure provides an imaging optical system with the ability to compensate for various types of aberrations sufficiently, and an image capture device and camera system, each including such an imaging optical system.

An imaging optical system according to an aspect of the present disclosure consists of: a first lens group having positive power; a second lens group having power; and a third lens group having power. The first lens group, the second lens group, and the third lens group are arranged in this order such that the first lens group is located closer to an object than any other lens group of the imaging optical system is. The first lens group and the third lens group are immobile along an optical axis and the second lens group moves along the optical axis while the imaging optical system is focusing to make a transition from an infinity in-focus state toward a close-object in-focus state. The first lens group consists of: a sub-lens group G1A; an aperture stop; and a sub-lens group G1B. The sub-lens group G1A, the aperture stop, and the sub-lens group G1B are arranged in this order such that the sub-lens group G1A is located closer to the object than the aperture stop or the sub-lens group G1B is.

The sub-lens group G1A includes, as a plurality of lenses: a meniscus lens L1A1 having positive power and having a convex surface facing the object; a meniscus lens L1A2 having negative power and having a convex surface facing the object; and a meniscus lens L1A3 having negative power and having a convex surface facing the object. The meniscus lens L1A1 is disposed closest to the object in the plurality of lenses. The meniscus lens L1A2 is disposed second closest to the object in the plurality of lenses. The meniscus lens L1A3 is disposed third closest to the object in the plurality of lenses.

The imaging optical system satisfies the following Inequality (1):

$$0.3 < BF/Y < 1.2 \tag{1}$$

where BF is a back focus of the imaging optical system, and Y is an image height of the imaging optical system in the infinity in-focus state.

A camera system according to another aspect of the present disclosure includes: an interchangeable lens unit including the imaging optical system described above; and a camera body including: an image sensor that receives an optical image formed by the imaging optical system and transforms the optical image into an electrical image signal; and a camera mount. The camera body is to be connected removably to the interchangeable lens unit via the camera mount. The interchangeable lens unit forms the optical image of the object on the image sensor.

An image capture device according to still another aspect of the present disclosure transforms an optical image of an object into an electrical image signal and displays and/or stores the electrical image signal thus transformed. The image capture device includes: the imaging optical system described above; and an image sensor. The imaging optical system forms the optical image of the object. The image sensor transforms the optical image formed by the imaging optical system into the electrical image signal.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Figure 1A:
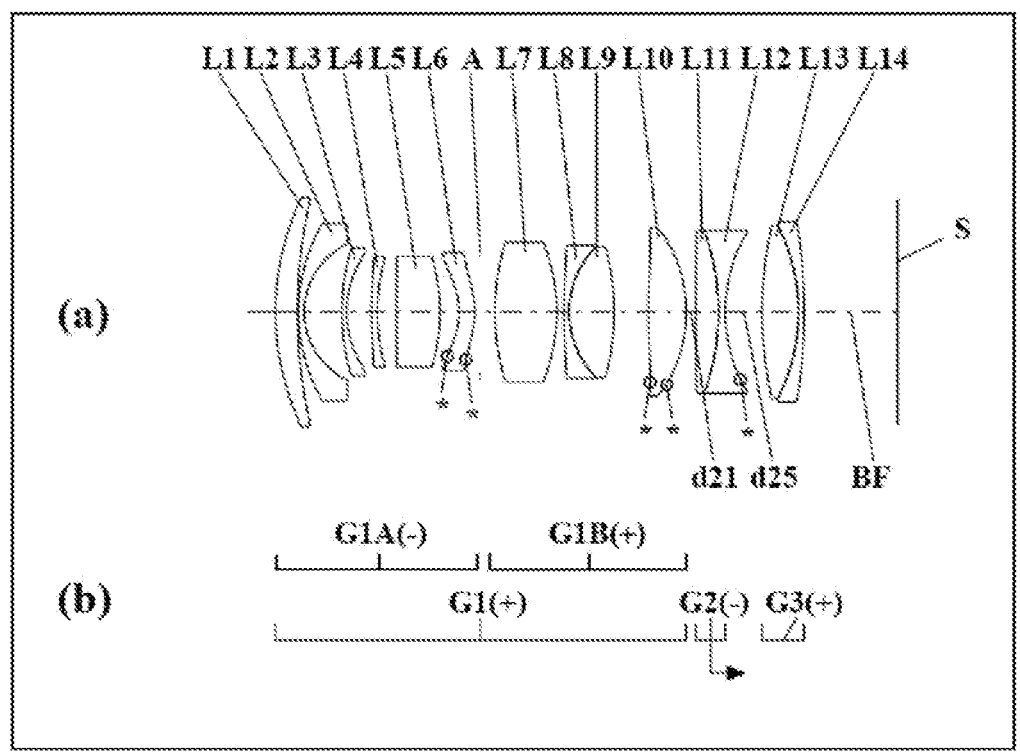
FIG. 1A illustrates lens arrangements showing an infinity in-focus state of an imaging optical system according to a first embodiment (corresponding to a first example of numerical values)
Figure 1B:
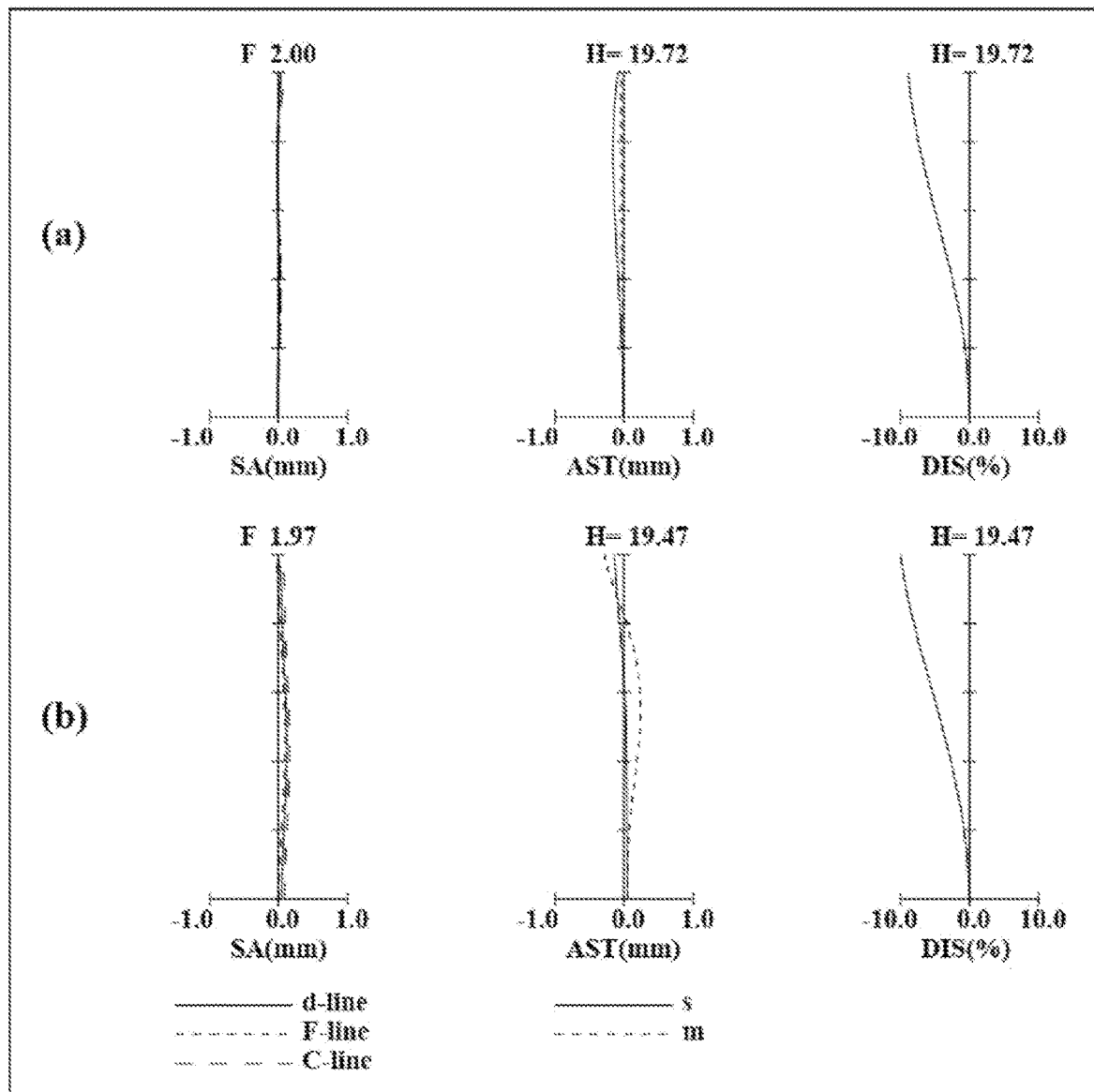
FIG. 1B illustrates longitudinal aberration diagrams showing what state the imaging optical system assumes in the first example of numerical values.

Embodiments of the present disclosure will now be described in detail with reference to the accompanying drawings as appropriate. Note that unnecessarily detailed description will be omitted. For example, detailed description of already well-known matters and redundant description of substantially the same configuration will be omitted. This is done to avoid making the following description overly redundant and thereby help one of ordinary skill in the art understand the present disclosure easily.

In addition, note that the accompanying drawings and the following description are provided by the applicant to help one of ordinary skill in the art understand the present disclosure fully and should not be construed as limiting the scope of the present disclosure, which is defined by the appended claims.

First to Fourth Embodiments

FIGS. 1A, 2A, 3A, and 4A illustrate lens arrangements and operations of an imaging optical system according to first to fourth embodiments, respectively.

As used herein, the terms "in-focus," "focusing," and "focus" refer to the imaging optical system is "in focus" state, "focusing," and in "focus" unless otherwise stated. In addition, the "optical axis" as used herein refers to the optical axis of the imaging optical system unless otherwise stated.

Portion (a) of FIGS. 1A, 2A, 3A, and 4A illustrates lens arrangements in the infinity in-focus state. In portion (a) of FIGS. 1A, 2A, 3A, and 4A, the straight line drawn at the right end indicates the position of the image plane S (corresponding to a plane on which the image sensor is disposed, and which faces the object as will be described later). Thus, in each of these drawings, the left side corresponds to the object side. In addition, a low-pass filter or cover glass CG, for example, may be arranged between the lens group on the last stage, facing the image plane S, of the imaging optical system and the image plane S. Note that respective portions (a) of FIGS. 1A, 2A, 3A, and 4A have the same aspect ratio.

In portion (a) of FIGS. 1A, 2A, 3A, and 4A, the asterisk (*) attached to a surface of a particular lens indicates that the surface is an aspheric surface. Note that in the lenses, an object-side surface or an image-side surface having no asterisks is a spherical surface.

On the second row of portion (b) of FIGS. 1A, 2A, 3A, and 4A, the respective lens groups are designated by the reference signs G1-G3 corresponding to their respective positions shown in portion (a). Furthermore, the signs (+) and (−) added to the reference signs of the respective lens groups G1-G3 in portion (b) of FIGS. 1A, 2A, 3A, and 4A indicate the powers of the respective lens groups G1-G3. That is to say, the positive sign (+) indicates positive power, and the negative sign (−) indicates negative power.

Also, on the first row of portion (b) of FIGS. 1A, 2A, 3A, and 4A, shown are sub-lens groups of the first lens group G1 shown on the second row of portion (b). The sign (+) or (−) is added to each sub-lens group. The signs (+) and (−) added to the reference signs of the respective sub-lens groups (G1A, G1B) in portion (b) of FIGS. 1A, 2A, 3A, and 4A indicate the powers of the respective sub-lens groups (G1A, G1B). That is to say, the positive sign (+) indicates positive power, and the negative sign (−) indicates negative power.

Also, either on the first row or second row of portion (b) of FIGS. 1A, 2A, 3A, and 4A, an arrow indicating the direction of movement while the imaging optical system is focusing to make a transition from the infinity in-focus state toward the close-object in-focus state is drawn under the reference sign of a particular lens group or particular sub-lens group.

First Embodiment

An imaging optical system according to a first embodiment will be described with reference to FIG. 1A.

FIG. 1A illustrates lens arrangements showing an infinity in-focus state of an imaging optical system according to a first embodiment and also illustrates how the imaging optical system operates in the infinity in-focus state.

As shown in FIG. 1A, the imaging optical system according to this embodiment consists of a first lens group G1 having positive power, a second lens group G2 having negative power, and a third lens group G3 having positive power. The first, second, and third lens groups G1-G3 are arranged in this order such that the first lens group G1 is located closer to the object than any other lens group of the imaging optical system is and that the third lens group G3 is located closer to the image than any other lens group of the imaging optical system is.

The first lens group G1 is made up of: a sub-lens group G1A having negative power; an aperture stop A; and a sub-lens group G1B having positive power. The sub-lens group G1A, the aperture stop A, and the sub-lens group G1B are arranged in this order such that the sub-lens group G1A is located closer to the object than the aperture stop A or the sub-lens group G1B is and that the sub-lens group G1B is located closer to the image than the aperture stop A or the sub-lens group G1A is.

The sub-lens group G1A is made up of a first lens L1 having positive power, a second lens L2 having negative power, a third lens L3 having negative power, a fourth lens L4 having negative power, a fifth lens L5 having positive power, and a sixth lens L6 having negative power. The first to sixth lenses L1-L6 are arranged in this order such that the first lens L1 is located closest to the object in the sub-lens group G1A and that the sixth lens L6 is located closest to the image in the sub-lens group G1A.

The sub-lens group G1B is made up of a seventh lens L7 having positive power, an eighth lens L8 having negative power, a ninth lens L9 having positive power, and a tenth lens L10 having positive power. The seventh to tenth lenses L7-L10 are arranged in this order such that the seventh lens L7 is located closest to the object in the sub-lens group G1B and that the tenth lens L10 is located closest to the image in the sub-lens group G1B.

The eighth lens L8 and the ninth lens L9 are bonded together with an adhesive such as a UV curable resin to form a bonded lens. In other words, the bonded lens includes the eighth lens L8 and the ninth lens L9.

The second lens group G2 is made up of an eleventh lens L11 having positive power and a twelfth lens L12 having negative power. The eleventh lens L11 and the twelfth lens L12 are arranged in this order such that the eleventh lens L11 is located closer to the object than the twelfth lens L12 is and that the twelfth lens L12 is located closer to the image than the eleventh lens L11 is.

The eleventh lens L11 and the twelfth lens L12 are bonded together with an adhesive such as a UV curable resin to form a bonded lens. In other words, the bonded lens includes the eleventh lens L11 and the twelfth lens L12.

The third lens group G3 consists of a thirteenth lens L13 having positive power and a fourteenth lens L14 having negative power. The thirteenth lens L13 and the fourteenth lens L14 are arranged in this order such that the thirteenth lens L13 is located closer to the object than the fourteenth lens L14 is and that the fourteenth lens L14 is located closer to the image than the thirteenth lens L13 is.

The thirteenth lens L13 and the fourteenth lens L14 are bonded together with an adhesive such as a UV curable resin to form a bonded lens. In other words, the bonded lens includes the thirteenth lens L13 and the fourteenth lens L14.

Next, the respective lenses that form these lens groups of the imaging optical system according to this embodiment will be described.

First, the respective lenses that form the sub-lens group G1A will be described.

The first lens L1 is a meniscus lens having a convex surface facing the object. The second lens L2 is a meniscus lens having a convex surface facing the object. The third lens L3 is a meniscus lens having a convex surface facing the object. The fourth lens L4 is a meniscus lens having a convex surface facing the object. The fifth lens L5 is a biconvex lens. The sixth lens L6 is a meniscus lens having a convex surface facing the image. Both surfaces of the sixth lens L6 are aspheric surfaces.

The first lens L1 is an example of the lens L1A1. The second lens L2 is an example of the lens L1A2. The third lens L3 is an example of the lens L1A3. The fourth lens L4 is an example of the lens L1A4.

Next, the respective lenses that form the sub-lens group G1B will be described.

The seventh lens L7 is a biconvex lens. The eighth lens L8 is a meniscus lens having a convex surface facing the object. The ninth lens L9 is a biconvex lens. The tenth lens L10 is a biconvex lens, both surfaces of which are aspheric surfaces.

Next, the respective lenses that form the second lens group G2 will be described.

The eleventh lens L11 is a biconvex lens. The twelfth lens L12 is a biconcave lens, both surfaces of which are aspheric surfaces.

Next, the respective lenses that form the third lens group G3 will be described.

The thirteenth lens L13 is a biconvex lens. The fourteenth lens L14 is meniscus lens having a convex surface facing the image.

While the imaging optical system according to this embodiment is focusing to make a transition from an infinity in-focus state toward a close-object in-focus state, the first lens group G1 does not move, the second lens group G2 moves along the optical axis toward the image, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the image.

More specifically, while the imaging optical system is focusing to make a transition from the infinity in-focus state toward the close-object in-focus state, the eleventh lens L11 and the twelfth lens L12 move toward the image.

Second Embodiment

An imaging optical system according to a second embodiment will be described with reference to FIG. 2A.

Figure 2A:
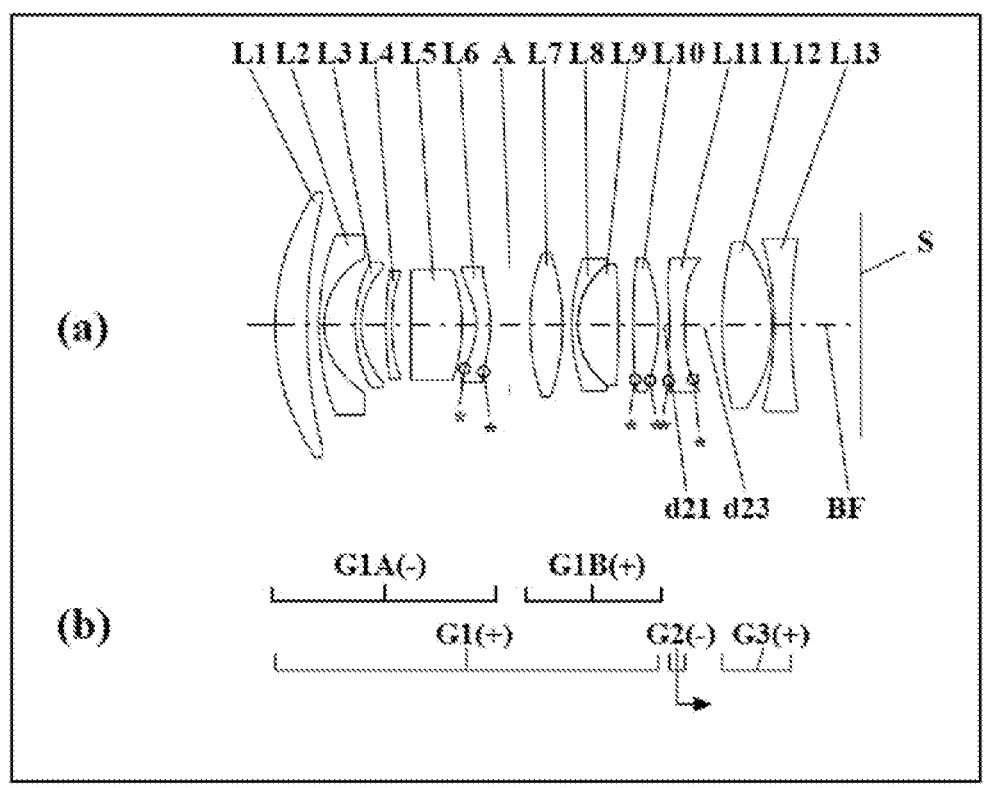
FIG. 2A illustrates lens arrangements showing an infinity in-focus state of an imaging optical system according to a second embodiment (corresponding to a second example of numerical values)
Figure 2B:
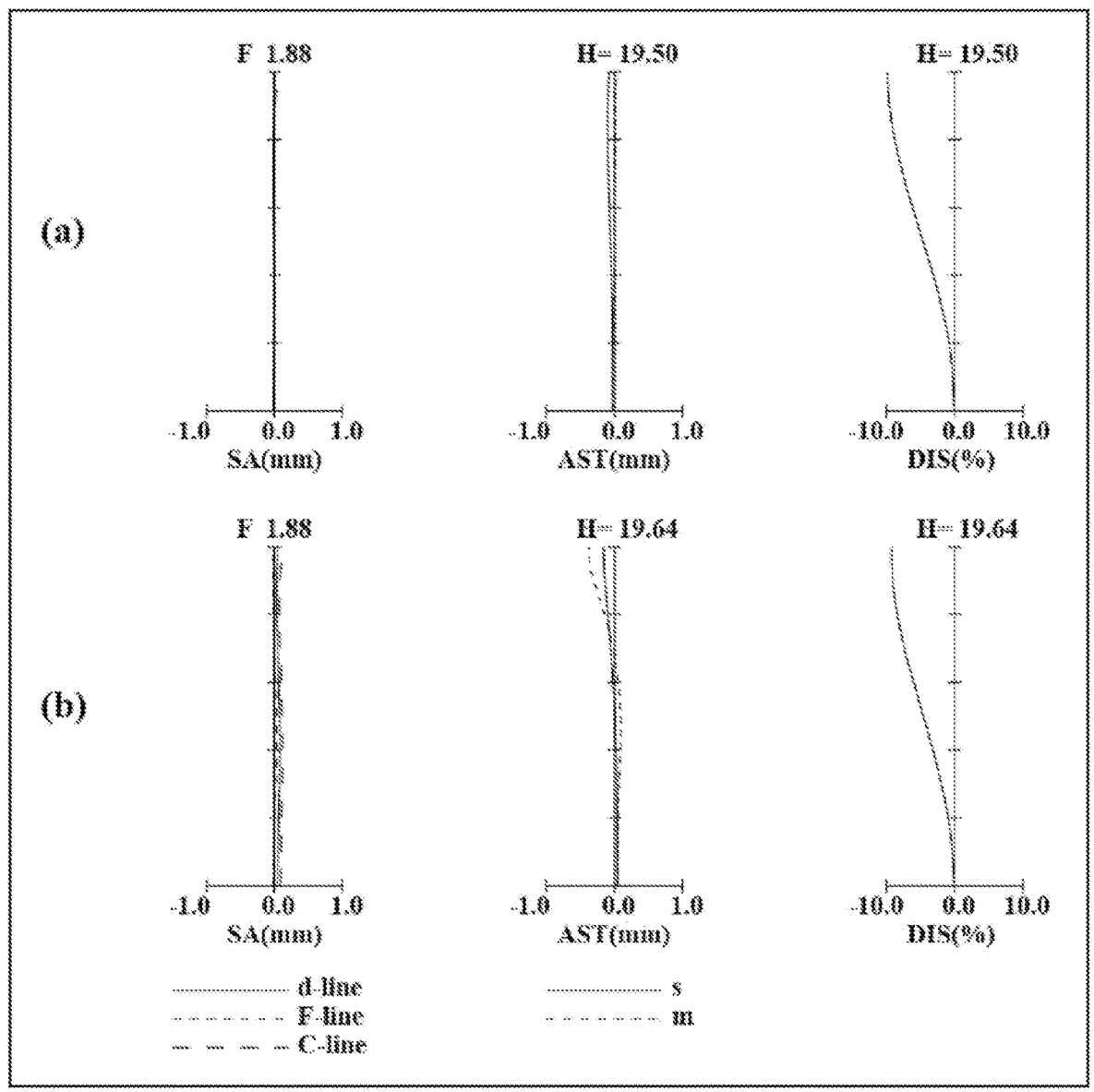
FIG. 2B illustrates longitudinal aberration diagrams showing what state the imaging optical system assumes in the second example of numerical values.

FIG. 2A illustrates lens arrangements showing an infinity in-focus state of an imaging optical system according to a second embodiment and also illustrates how the imaging optical system operates in the infinity in-focus state.

As shown in FIG. 2A, the imaging optical system according to this embodiment consists of a first lens group G1 having positive power, a second lens group G2 having negative power, and a third lens group G3 having positive power. The first, second, and third lens groups G1-G3 are arranged in this order such that the first lens group G1 is located closer to the object than any other lens group of the imaging optical system is and that the third lens group G3 is located closer to the image than any other lens group of the imaging optical system is.

The first lens group G1 is made up of: a sub-lens group G1A having negative power; an aperture stop A; and a sub-lens group G1B having positive power. The sub-lens group G1A, the aperture stop A, and the sub-lens group G1B are arranged in this order such that the sub-lens group G1A is located closer to the object than the aperture stop A or the sub-lens group G1B is and that the sub-lens group G1B is located closer to the image than the aperture stop A or the sub-lens group G1A is.

The sub-lens group G1A is made up of a first lens L1 having positive power, a second lens L2 having negative power, a third lens L3 having negative power, a fourth lens L4 having negative power, a fifth lens L5 having positive power, and a sixth lens L6 having negative power. The first to sixth lenses L1-L6 are arranged in this order such that the first lens L1 is located closest to the object in the sub-lens group G1A and that the sixth lens L6 is located closest to the image in the sub-lens group G1A.

The sub-lens group G1B is made up of a seventh lens L7 having positive power, an eighth lens L8 having negative power, a ninth lens L9 having positive power, and a tenth lens L10 having positive power. The seventh to tenth lenses L7-L10 are arranged in this order such that the seventh lens L7 is located closest to the object in the sub-lens group G1B and that the tenth lens L10 is located closest to the image in the sub-lens group G1B.

The eighth lens L8 and the ninth lens L9 are bonded together with an adhesive such as a UV curable resin to form a bonded lens. In other words, the bonded lens includes the eighth lens L8 and the ninth lens L9.

The second lens group G2 consists of an eleventh lens L11 having negative power.

The third lens group G3 is made up of a twelfth lens L12 having positive power and a thirteenth lens L13 having negative power. The twelfth lens L12 and the thirteenth lens L13 are arranged in this order such that the twelfth lens L12 is located closer to the object than the thirteenth lens L13 is and that the thirteenth lens L13 is located closer to the image than the twelfth lens L12 is.

Next, the respective lenses that form these lens groups of the imaging optical system according to this embodiment will be described.

First, the respective lenses that form the sub-lens group G1A will be described.

The first lens L1 is a meniscus lens having a convex surface facing the object. The second lens L2 is a meniscus lens having a convex surface facing the object. The third lens L3 is a meniscus lens having a convex surface facing the object. The fourth lens L4 is a meniscus lens having a convex surface facing the object. The fifth lens L5 is a biconvex lens. The sixth lens L6 is a meniscus lens having a convex surface facing the image. Both surfaces of the sixth lens L6 are aspheric surfaces.

The first lens L1 is an example of the lens L1A1. The second lens L2 is an example of the lens L1A2. The third lens L3 is an example of the lens L1A3. The fourth lens L4 is an example of the lens L1A4.

Next, the respective lenses that form the sub-lens group G1B will be described.

The seventh lens L7 is a biconvex lens. The eighth lens L8 is a meniscus lens having a convex surface facing the object. The ninth lens L9 is a biconvex lens. The tenth lens L10 is a biconvex lens, both surfaces of which are aspheric surfaces.

Next, the lens that forms the second lens group G2 will be described.

The eleventh lens L11 is a biconvex lens.

Next, the respective lenses that form the third lens group G3 will be described.

The twelfth lens L12 is a biconvex lens. The thirteenth lens L13 is a biconcave lens.

While the imaging optical system according to this embodiment is focusing to make a transition from an infinity in-focus state toward a close-object in-focus state, the first lens group G1 does not move, the second lens group G2 moves along the optical axis toward the image, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the image.

More specifically, while the imaging optical system is focusing to make a transition from the infinity in-focus state toward the close-object in-focus state, the eleventh lens L11 moves toward the image.

Third Embodiment

An imaging optical system according to a third embodiment will be described with reference to FIG. 3A.

Figure 3A:
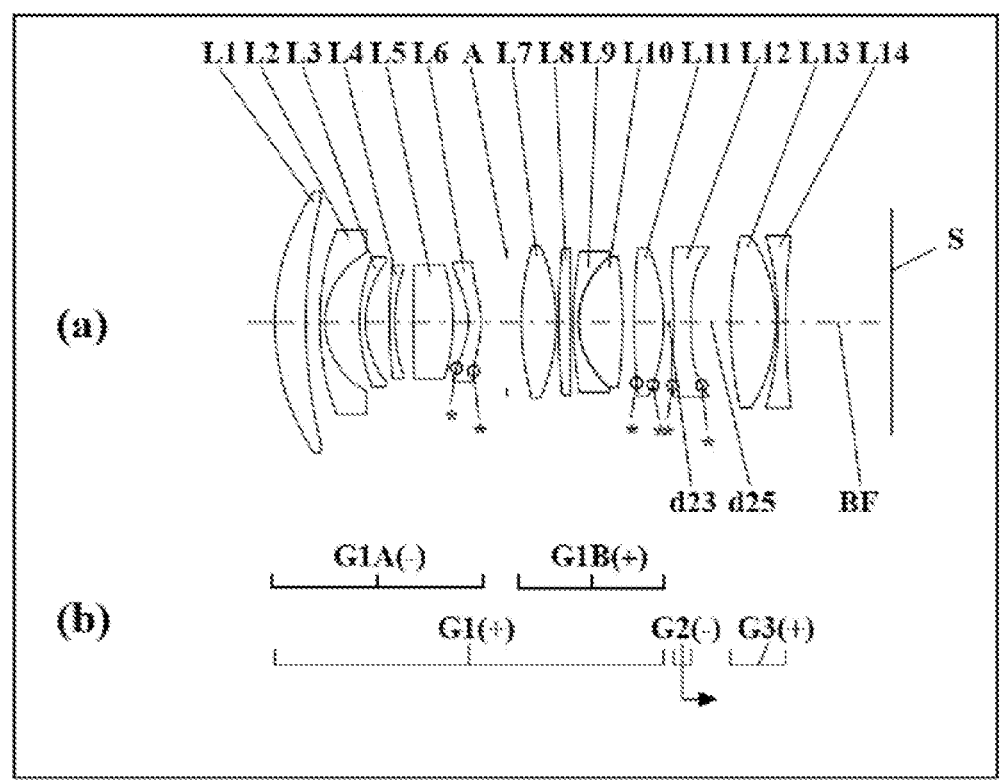
FIG. 3A illustrates lens arrangements showing an infinity in-focus state of an imaging optical system according to a third embodiment (corresponding to a third example of numerical values)
Figure 3B:
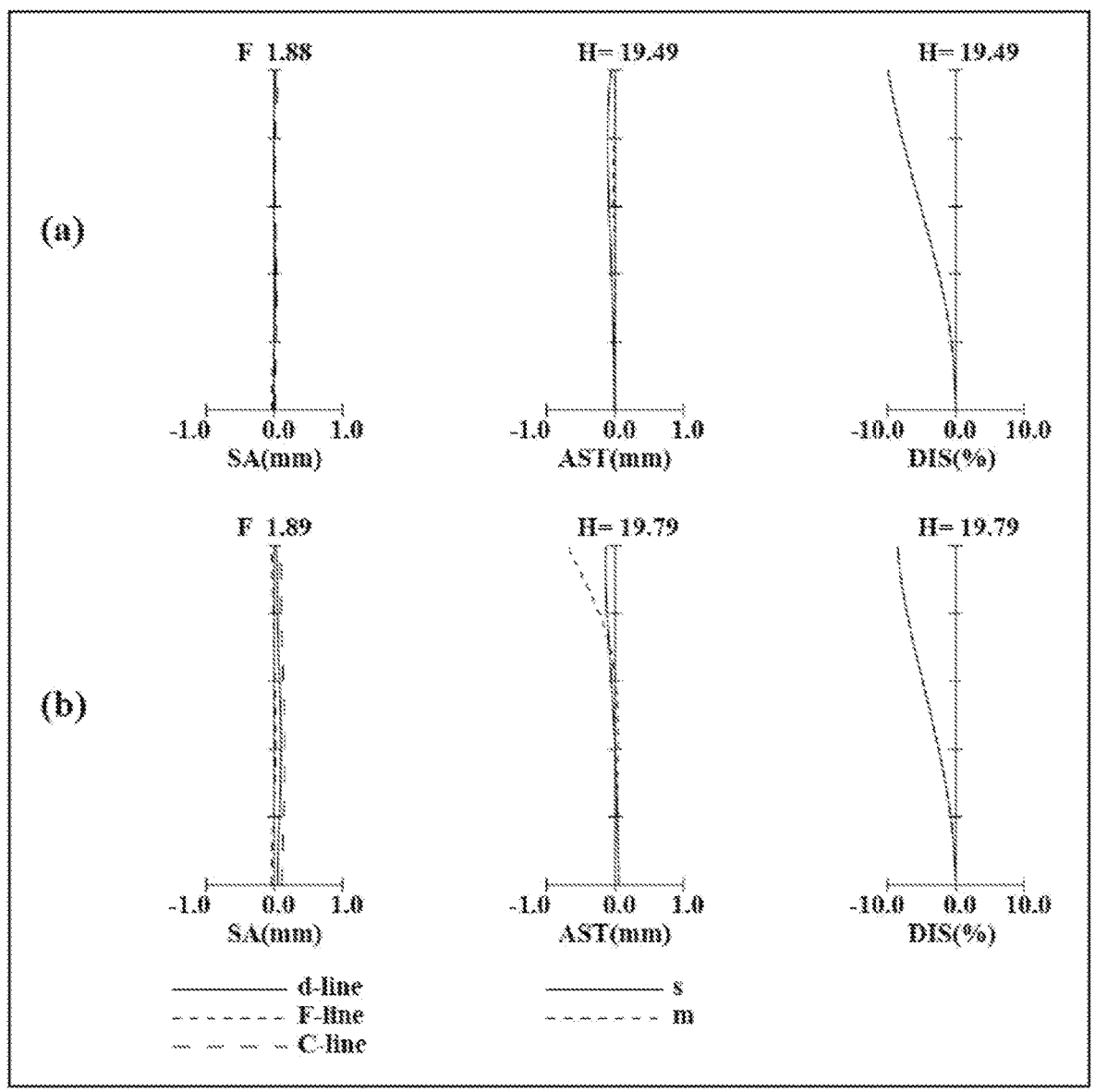
FIG. 3B illustrates longitudinal aberration diagrams showing what state the imaging optical system assumes in the third example of numerical values.

FIG. 3A illustrates lens arrangements showing an infinity in-focus state of an imaging optical system according to a third embodiment and also illustrates how the imaging optical system operates in the infinity in-focus state.

As shown in FIG. 3A, the imaging optical system according to this embodiment consists of a first lens group G1 having positive power, a second lens group G2 having negative power, and a third lens group G3 having positive power. The first, second, and third lens groups G1-G3 are arranged in this order such that the first lens group G1 is located closer to the object than any other lens group of the imaging optical system is and that the third lens group G3 is located closer to the image than any other lens group of the imaging optical system is.

The first lens group G1 is made up of: a sub-lens group G1A having negative power; an aperture stop A; and a sub-lens group G1B having positive power. The sub-lens group G1A, the aperture stop A, and the sub-lens group G1B are arranged in this order such that the sub-lens group G1A is located closer to the object than the aperture stop A or the sub-lens group G1B is and that the sub-lens group G1B is located closer to the image than the aperture stop A or the sub-lens group G1A is.

The sub-lens group G1A is made up of a first lens L1 having positive power, a second lens L2 having negative power, a third lens L3 having negative power, a fourth lens L4 having negative power, a fifth lens L5 having positive power, and a sixth lens L6 having negative power. The first to sixth lenses L1-L6 are arranged in this order such that the first lens L1 is located closest to the object in the sub-lens group G1A and that the sixth lens L6 is located closest to the image in the sub-lens group G1A.

The sub-lens group G1B is made up of a seventh lens L7 having positive power, an eighth lens L8 having positive power, a ninth lens L9 having negative power, a tenth lens L10 having positive power, and an eleventh lens L11 having positive power. The seventh to eleventh lenses L7-L11 are arranged in this order such that the seventh lens L7 is located closest to the object in the sub-lens group G1B and that the eleventh lens L11 is located closest to the image in the sub-lens group G1B.

The ninth lens L9 and the tenth lens L10 are bonded together with an adhesive such as a UV curable resin to form a bonded lens. In other words, the bonded lens includes the ninth lens L9 and the tenth lens L10.

The second lens group G2 consists of a twelfth lens L12 having negative power.

The third lens group G3 is made up of a thirteenth lens L13 having positive power and a fourteenth lens L14 having negative power. The thirteenth lens L13 and the fourteenth lens L14 are arranged in this order such that the thirteenth lens L13 is located closer to the object than the fourteenth lens L14 is and that the fourteenth lens L14 is located closer to the image than the thirteenth lens L13 is.

Next, the respective lenses that form these lens groups of the imaging optical system according to this embodiment will be described.

First, the respective lenses that form the sub-lens group G1A will be described.

The first lens L1 is a meniscus lens having a convex surface facing the object. The second lens L2 is a meniscus lens having a convex surface facing the object. The third lens L3 is a meniscus lens having a convex surface facing the object. The fourth lens L4 is a meniscus lens having a convex surface facing the object. The fifth lens L5 is a biconvex lens. The sixth lens L6 is a meniscus lens having a convex surface facing the image. Both surfaces of the sixth lens L6 are aspheric surfaces.

The first lens L1 is an example of the lens UAL The second lens L2 is an example of the lens L1A2. The third lens L3 is an example of the lens L1A3. The fourth lens L4 is an example of the lens L1A4.

Next, the respective lenses that form the sub-lens group G1B will be described.

The seventh lens L7 is a biconvex lens. The eighth lens L8 is a meniscus lens having a convex surface facing the object. The ninth lens L9 is a meniscus lens having a convex surface facing the object. The tenth lens L10 is a biconvex lens. The eleventh lens L11 is a biconvex lens.

Next, the lens that forms the second lens group G2 will be described.

The twelfth lens L12 is a biconcave lens, both surfaces of which are aspheric surfaces.

Next, the respective lenses that form the third lens group G3 will be described.

The thirteenth lens L13 is a biconvex lens. The fourteenth lens L14 is a meniscus lens having a convex surface facing the image.

While the imaging optical system according to this embodiment is focusing to make a transition from an infinity in-focus state toward a close-object in-focus state, the first lens group G1 does not move, the second lens group G2 moves along the optical axis toward the image, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the image.

More specifically, while the imaging optical system is focusing to make a transition from the infinity in-focus state toward the close-object in-focus state, the twelfth lens L12 moves toward the image.

Fourth Embodiment

An imaging optical system according to a fourth embodiment will be described with reference to FIG. 4A.

Figure 4A:
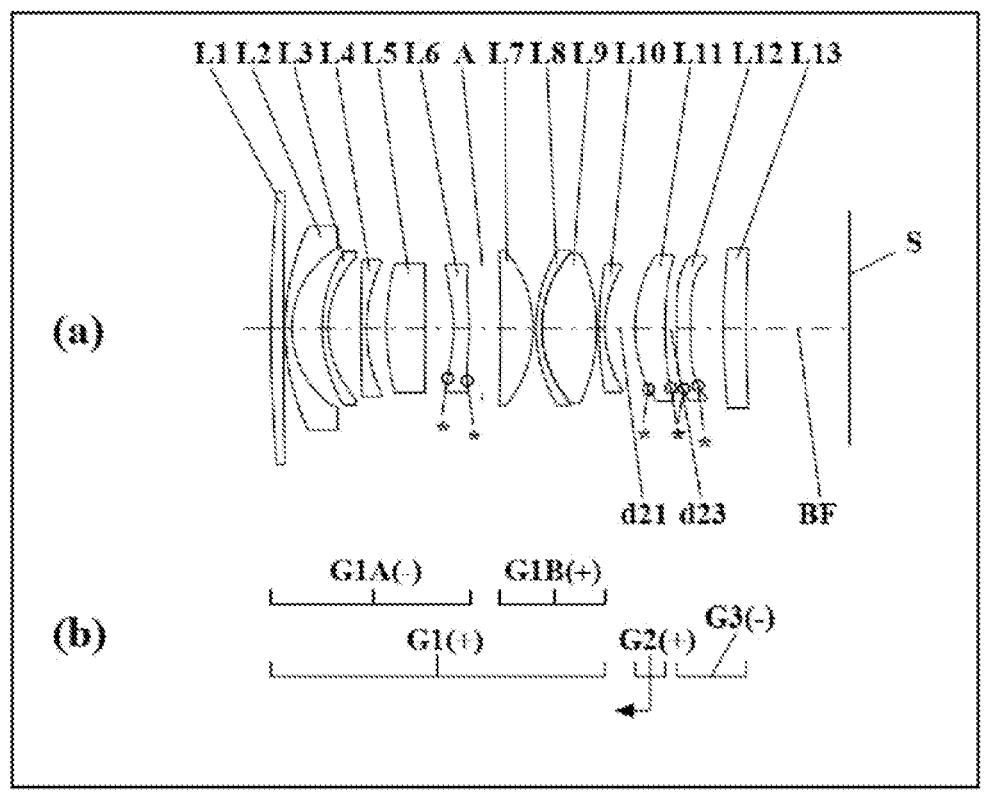
FIG. 4A illustrates lens arrangements showing an infinity in-focus state of an imaging optical system according to a fourth embodiment (corresponding to a fourth example of numerical values)
Figure 4B:
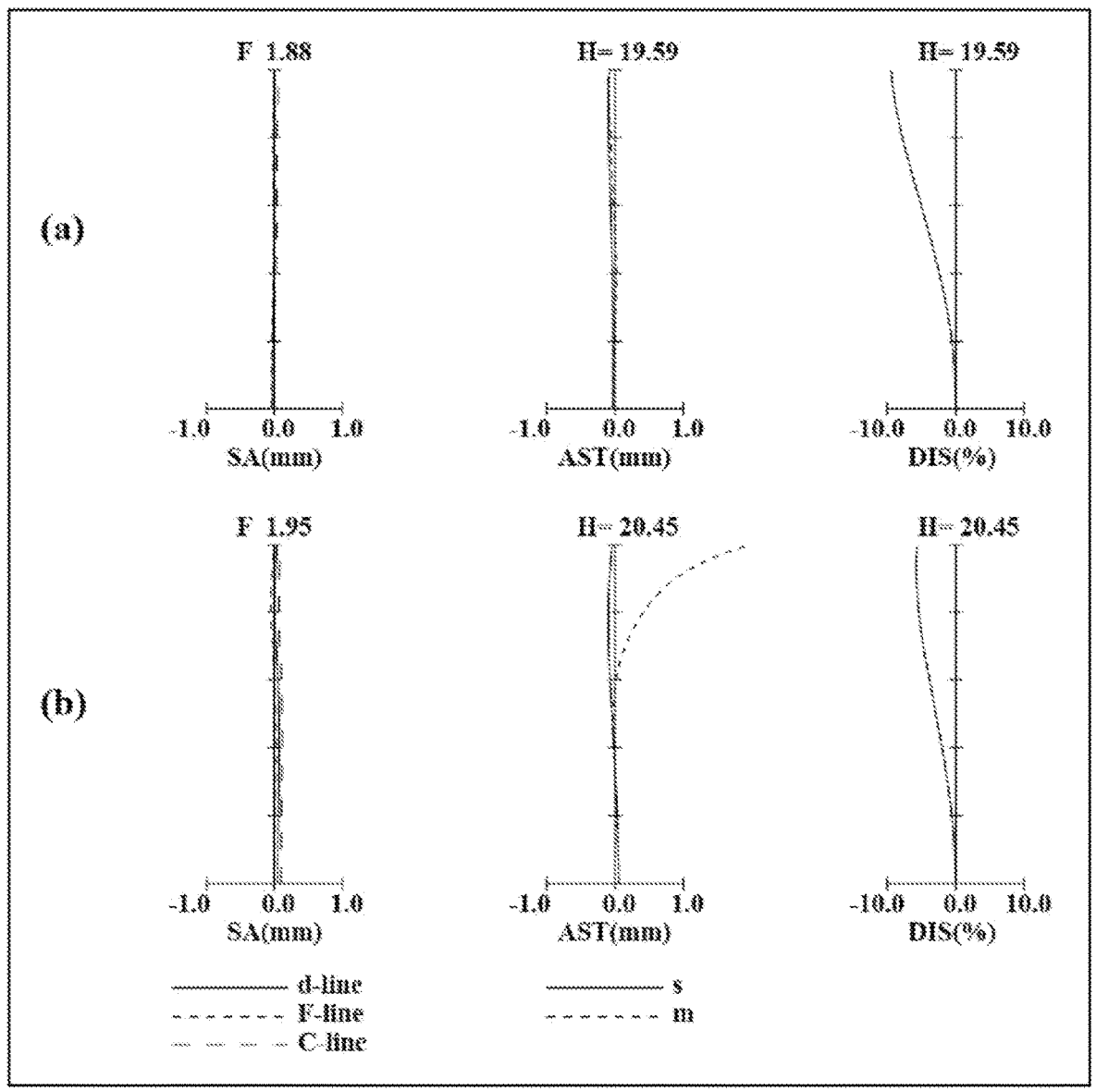
FIG. 4B illustrates longitudinal aberration diagrams showing what state the imaging optical system assumes in the fourth example of numerical values.

FIG. 4A illustrates lens arrangements showing an infinity in-focus state of an imaging optical system according to a fourth embodiment and also illustrates how the imaging optical system operates in the infinity in-focus state.

As shown in FIG. 4A, the imaging optical system according to this embodiment consists of a first lens group G1 having positive power, a second lens group G2 having positive power, and a third lens group G3 having negative power. The first, second, and third lens groups G1-G3 are arranged in this order such that the first lens group G1 is located closer to the object than any other lens group of the imaging optical system is and that the third lens group G3 is located closer to the image than any other lens group of the imaging optical system is.

The first lens group G1 is made up of: a sub-lens group G1A having negative power; an aperture stop A; and a sub-lens group G1B having positive power. The sub-lens group G1A, the aperture stop A, and the sub-lens group G1B are arranged in this order such that the sub-lens group G1A is located closer to the object than the aperture stop A or the sub-lens group G1B is and that the sub-lens group G1B is located closer to the image than the aperture stop A or the sub-lens group G1A is.

The sub-lens group G1A is made up of a first lens L1 having positive power, a second lens L2 having negative power, a third lens L3 having negative power, a fourth lens L4 having negative power, a fifth lens L5 having positive power, and a sixth lens L6 having negative power. The first to sixth lenses L1-L6 are arranged in this order such that the first lens L1 is located closest to the object in the sub-lens group G1A and that the sixth lens L6 is located closest to the image in the sub-lens group G1A.

The sub-lens group G1B is made up of a seventh lens L7 having positive power, an eighth lens L8 having negative power, a ninth lens L9 having positive power, and a tenth lens L10 having negative power. The seventh to tenth lenses L7-L10 are arranged in this order such that the seventh lens L7 is located closest to the object in the sub-lens group G1B and that the tenth lens L10 is located closest to the image in the sub-lens group G1B.

The eighth lens L8 and the ninth lens L9 are bonded together with an adhesive such as a UV curable resin to form a bonded lens. In other words, the bonded lens includes the eighth lens L8 and the ninth lens L9.

The second lens group G2 consists of an eleventh lens L11 having positive power.

The third lens group G3 is made up of a twelfth lens L12 having negative power and a thirteenth lens L13 having positive power. The twelfth lens L12 and the thirteenth lens L13 are arranged in this order such that the twelfth lens L12 is located closer to the object than the thirteenth lens L13 is and that the thirteenth lens L13 is located closer to the image than the twelfth lens L12 is.

Next, the respective lenses that form these lens groups of the imaging optical system according to this embodiment will be described.

First, the respective lenses that form the sub-lens group G1A will be described.

The first lens L1 is a meniscus lens having a convex surface facing the object. The second lens L2 is a meniscus lens having a convex surface facing the object. The third lens L3 is a meniscus lens having a convex surface facing the object. The fourth lens L4 is a meniscus lens having a convex surface facing the object. The fifth lens L5 is a biconvex lens. The sixth lens L6 is a meniscus lens having a convex surface facing the image. Both surfaces of the sixth lens L6 are aspheric surfaces.

The first lens L1 is an example of the lens L1A1. The second lens L2 is an example of the lens L1A2. The third lens L3 is an example of the lens L1A3. The fourth lens L4 is an example of the lens L1A4.

Next, the respective lenses that form the sub-lens group G1B will be described.

The seventh lens L7 is a meniscus lens having a convex surface facing the image. The eighth lens L8 is a meniscus lens having a convex surface facing the object. The ninth lens L9 is a biconvex lens. The tenth lens L10 is a meniscus lens having a convex surface facing the object.

Next, the lens that forms the second lens group G2 will be described.

The eleventh lens L11 is a meniscus lens having a convex surface facing the object. Both surfaces of the eleventh lens L11 are aspheric surfaces.

Next, the respective lenses that form the third lens group G3 will be described.

The twelfth lens L12 is a biconcave lens, both surface of which are aspheric surfaces. The thirteenth lens L13 is a meniscus lens having a convex surface facing the object.

While the imaging optical system according to this embodiment is focusing to make a transition from an infinity in-focus state toward a close-object in-focus state, the first lens group G1 does not move, the second lens group G2 moves along the optical axis toward the object, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the object.

More specifically, while the imaging optical system is focusing to make a transition from the infinity in-focus state toward the close-object in-focus state, the eleventh lens L11 moves toward the object.

(Conditions and Advantages)

Next, conditions that an imaging optical system such as the ones according to the first to fourth embodiments described above may satisfy will be described. That is to say, a plurality of conditions may be defined for the imaging optical system according to each of these four embodiments. In that case, an imaging optical system, of which the configuration satisfies all of these conditions, is most advantageous. Alternatively, an imaging optical system that achieves its expected advantages by satisfying any of the individual conditions to be described below may also be provided.

As in the imaging optical system according to each of the first to fourth embodiments described above, for example, an imaging optical system according to the present disclosure includes: a first lens group G1 having positive power; a second lens group G2 having power; and a third lens group G3 having power. The first lens group G1, the second lens group G2, and the third lens group G3 are arranged in this order such that the first lens group G1 is located closer to an object than any other lens group of the imaging optical system is. The first lens group G1 and the third lens group G3 are immobile along an optical axis and the second lens group G2 moves along the optical axis while the imaging optical system is focusing to make a transition from an infinity in-focus state toward a close-object in-focus state.

The first lens group G1 consists of: a sub-lens group G1A; an aperture stop A; and a sub-lens group G1B. The sub-lens group G1A, the aperture stop A, and the sub-lens group G1B are arranged in this order such that the sub-lens group G1A is located closer to the object than the aperture stop A or the sub-lens group G1B is.

The sub-lens group G1A includes: a meniscus lens L1A1 having positive power and having a convex surface facing the object; a meniscus lens L1A2 having negative power and having a convex surface facing the object; and a meniscus lens L1A3 having negative power and having a convex surface facing the object. The meniscus lens L1A1 is disposed closest to the object in the plurality of lenses. The meniscus lens L1A2 is disposed second closest to the object in the plurality of lenses. The meniscus lens L1A3 is disposed third closest to the object in the plurality of lenses.

In this basic configuration, the sub-lens group G1A is made up of: a meniscus lens L1A1 having positive power and having a convex surface facing the object; a meniscus lens L1A2 having negative power and having a convex surface facing the object; and a meniscus lens L1A3 having negative power and having a convex surface facing the object such that the meniscus lenses L1A1, L1A2, and L1A3 are disposed closest, second closest, and third closest, respectively, to the object in the plurality of lenses. This enables providing an imaging optical system having the ability to compensate for various types of aberrations (such as distortion, among other things), while widening the angle of view.

An imaging optical system having the basic configuration described above preferably satisfies the condition expressed by the following Inequality (1):

$$0.3 < BF/Y < 1.2 \quad (1)$$

where BF is a back focus of the imaging optical system (i.e., a distance on the optical axis from the lens surface closest to the image plane S to the image plane P), and Y is an image height of the imaging optical system in the infinity in-focus state. Note that the units of these parameters should be the same (e.g., the units of BF and Y are both millimeters).

The condition expressed by this Inequality (1) defines a preferred ratio of the back focus of the imaging optical system to the image height of the imaging optical system in the infinity in-focus state.

If BF/Y were equal to or less than the lower limit value set by this Inequality (1), then the back focus value would be so small as to cause interference often between the lens and the image capturing plane, which is unfavorable.

If BF/Y were equal to or greater than the upper limit value set by this Inequality (1), then the back focus value would be so large as to cause a significant increase in the overall size of the lens, which is also unbeneficial.

To enhance the advantage described above, at least one of the conditions expressed by the following Inequalities (1a) and (1b) is preferably satisfied:

$$0.4 < BF/Y \quad (1a)$$

$$BF/Y < 1.1 \quad (1b).$$

To further enhance the advantage described above, at least one of the conditions expressed by the following Inequalities (1c) and (1d) is more preferably satisfied:

$$0.4 < BF/Y \quad (1c)$$

$$BF/Y < 1.0 \quad (1d).$$

Also, an imaging optical system having the basic configuration described above preferably satisfies the condition expressed by the following Inequality (2):

$$vd\_L1A3 > 60 \quad (2)$$

where vd_L1A3 is an Abbe number of the lens L1A3 in response to a d-line.

The condition expressed by this Inequality (2) defines a preferred Abbe number of the lens L1A3 in response to a d-line.

Using a glass material with a large Abbe number and low dispersion for the lens L1A3 enables compensating for chromatic aberration of magnification.

To enhance the advantage described above, the condition expressed by the following Inequality (2a) is preferably satisfied:

$$vd\_L1A3 > 65 \quad (2a).$$

To further enhance the advantage described above, the condition expressed by the following Inequality (2b) is more preferably satisfied:

$$vd\_L1A3 > 67 \quad (2b).$$

Also, an imaging optical system having the basic configuration described above preferably satisfies the condition expressed by the following Inequality (3):

$$0.010 < \Delta PgF\_L1A3 \quad (3)$$

where $\Delta PgF\_L1A3$ is a degree of anomalous dispersion of the lens L1A3 in response to a g-line and an F-line.

The condition expressed by this Inequality (3) defines a preferred degree of anomalous dispersion of the lens L1A3 in response to a g-line and an F-line.

Using a glass material having anomalous dispersion for the lens L1A3 makes it easier to make correction to the secondary spectrum of chromatic aberration.

To enhance the advantage described above, the condition expressed by the following Inequality (3a) is preferably satisfied:

$$0.015 < \Delta PgF\_L1A3 \quad (3a).$$

To further enhance the advantage described above, the condition expressed by the following Inequality (3b) is more preferably satisfied:

$$0.018 < \Delta PgF\_L1A3 \quad (3b)$$

Furthermore, in an imaging optical system having the basic configuration described above, the sub-lens group G1A preferably further includes a lens L1A4 disposed fourth closest to the object in the plurality of lenses included in the sub-lens group G1A, and the imaging optical system preferably satisfies the following Inequality (4):

$$vd\_L1A4 > 60 \quad (4)$$

where vd_L1A4 is an Abbe number of the lens L1A4 in response to a d-line.

The condition expressed by this Inequality (4) defines a preferred Abbe number of the lens L1A4 in response to a d-line.

Using a glass material with a large Abbe number and low dispersion for the lens L1A4 enables compensating for chromatic aberration of magnification.

To enhance the advantage described above, the condition expressed by the following Inequality (4a) is preferably satisfied:

$$vd\_L1A4 > 65 \quad (4a)$$

To further enhance the advantage described above, the condition expressed by the following Inequality (4b) is more preferably satisfied:

$$vd\_L1A4 > 67 \quad (4b)$$

Furthermore, in an imaging optical system having the basic configuration described above, the sub-lens group G1A preferably further includes a lens L1A4 disposed fourth closest to the object in the plurality of lenses included in the sub-lens group G1A, and the imaging optical system preferably satisfies the following Inequality (5):

$$0.010 < \Delta PgF\_L1A4 \quad (5)$$

where ΔPgF_L1A4 is a degree of anomalous dispersion of the lens L1A4 in response to a g-line and an F-line.

The condition expressed by this Inequality (5) defines a preferred degree of anomalous dispersion of the lens L1A4 in response to a g-line and an F-line.

Using a glass material having anomalous dispersion for the lens L1A4 makes it easier to make correction to the secondary spectrum of chromatic aberration.

To enhance the advantage described above, the condition expressed by the following Inequality (5a) is preferably satisfied:

$$0.015 < \Delta PgF\_L1A4 \quad (5a)$$

To further enhance the advantage described above, the condition expressed by the following Inequality (5b) is more preferably satisfied:

$$0.018 < \Delta PgF\_L1A4 \quad (5b)$$

Also, an imaging optical system having the basic configuration described above preferably satisfies the condition expressed by the following Inequality (6):

$$1 < f\_L1A1/f < 30 \quad (6)$$

where f_L1A1 is a focal length of the lens L1A1, and f is a focal length of the entire imaging optical system in the infinity in-focus state. Note that the units of these parameters should be the same (e.g., the units of f_L1A1 and f are both millimeters).

The condition expressed by this Inequality (6) defines a preferred ratio of the focal length of the lens L1A1 to the focal length of the entire imaging optical system in the infinity in-focus state.

If f_L1A1/f were equal to or less than the lower limit value set by this Inequality (6), then the power of the lens L1A1 would be so large as to make it difficult to compensate for various aberrations (such as field curvature, in particular).

If f_L1A1/f were equal to or greater than the upper limit value set by this Inequality (6), then the power of the lens L1A1 would be too small to converge the light beam sufficiently effectively, thus making it difficult to provide an optical system of a reduced size.

To enhance the advantage described above, at least one of the conditions expressed by the following Inequalities (6a) and (6b) is preferably satisfied:

$$2 < f\_L1A1/f \quad (6a)$$

$$f\_L1A1/f < 25 \quad (6b)$$

To further enhance the advantage described above, at least one of the conditions expressed by the following Inequalities (6c) and (6d) is more preferably satisfied:

$$4 < f\_L1A1/f \quad (6c)$$

$$f\_L1A1/f < 20 \quad (6d)$$

Also, an imaging optical system having the basic configuration described above preferably satisfies the condition expressed by the following Inequality (7):

$$0.5 < ENP/f < 1.5 \quad (7)$$

where ENP is a distance on the optical axis from a lens surface closest to the object in the imaging optical system (i.e., the object-side surface of the first lens L1) to an entrance pupil position, and f is a focal length of the entire imaging optical system in the infinity in-focus state. Note that the units of these parameters should be the same (e.g., the units of ENP and f are both millimeters).

The condition expressed by this Inequality (7) defines a preferred ratio of the distance on the optical axis from a lens surface closest to the object to the entrance pupil position to the focal length of the entire imaging optical system in the infinity in-focus state.

If ENP/f were equal to or less than the lower limit value set by this Inequality (7), then it would be difficult to compensate for distortion or coma aberration for the sub-lens group G1A located close to the object, which is unfavorable.

If ENP/f were equal to or greater than the upper limit value set by this Inequality (7), then the angle of view would be widened to cause a significant increase in the diameter of the lens at the front end, which is unbeneficial for downsizing.

To enhance the advantage described above, at least one of the conditions expressed by the following Inequalities (7a) and (7b) is preferably satisfied:

$$0.6 < ENP/f \quad (7a)$$

$$ENP/f < 1.4 \quad (7b)$$

To further enhance the advantage described above, at least one of the conditions expressed by the following Inequalities (7c) and (7d) is more preferably satisfied:

$$0.7 < ENP/f \quad (7c)$$

$$ENP/f < 1.3 \quad (7d)$$

Furthermore, in an imaging optical system having the basic configuration described above, the sub-lens group G1A preferably further includes a biconvex lens (example of which is the fifth lens L5 according to the first to fourth embodiments described above), and the imaging optical system preferably satisfies the following Inequality (8):

$$1.85 < nd\_L1Ap \tag{8}$$

where nd_L1Ap is a refractive index of the biconvex lens in response to a d-line.

The condition expressed by this Inequality (8) defines a preferred refractive index of the biconvex lens included in the sub-lens group G1A in response to a d-line.

If nd_L1Ap were equal to or less than the lower limit value set by this Inequality (8), then it would be difficult to reduce the diameter of the lens at the front end and compensate for spherical aberration.

To enhance the advantage described above, the condition expressed by the following Inequality (8a) is preferably satisfied:

$$1.90 < nd\_L1Ap \tag{8a}$$

To further enhance the advantage described above, the condition expressed by the following Inequality (8b) is more preferably satisfied:

$$1.95 < nd\_L1Ap \tag{8b}$$

Also, an imaging optical system having the basic configuration described above preferably satisfies the condition expressed by the following Inequality (9):

$$1.5 < |f2/f| < 3.5 \tag{9}$$

where f2 is a focal length of the second lens group G2 and f is a focal length of the entire imaging optical system in the infinity in-focus state. Note that the units of these parameters should be the same (e.g., the units of f2 and f are both millimeters).

The condition expressed by this Inequality (9) defines a preferred ratio of the focal length of the second lens group G2 to the focal length of the entire imaging optical system in the infinity in-focus state.

If |f2/f| were equal to or less than the lower limit value set by this Inequality (9), then the power of the second lens group G2 as the focus lens group would increase so much as to cause a significant decline in focus stopping accuracy.

If |f2/f| were equal to or greater than the upper limit value set by this Inequality (9), then the power of the second lens group G2 as the focus lens group would decrease so much as to cause a significant decrease in focus speed.

To enhance the advantage described above, at least one of the conditions expressed by the following Inequalities (9a) and (9b) is preferably satisfied:

$$1.7 < |f2/f| \tag{9a}$$

$$|f2/f| < 3.3 \tag{9b}$$

To further enhance the advantage described above, at least one of the conditions expressed by the following Inequalities (9c) and (9d) is more preferably satisfied:

$$2.0 < |f2/f| \tag{9c}$$

$$|f2/f| < 3.0 \tag{9d}$$

Also, an imaging optical system having the basic configuration described above preferably satisfies the condition expressed by the following Inequality (10):

$$4.5 < LL/Y < 6.5 \tag{10}$$

where LL is a total optical length of the imaging optical system in the infinity in-focus state (i.e., the distance on the optical axis from the object-side surface of the first lens L1 to the image plane S), and Y is a maximum image height of the imaging optical system in the infinity in-focus state. Note that the units of these parameters should be the same (e.g., the units of LL and Y are both millimeters).

The condition expressed by this Inequality (10) defines a preferred ratio of the total optical length of the imaging optical system in the infinity in-focus state to the maximum image height of the imaging optical system in the infinity in-focus state.

If LL/Y were equal to or less than the lower limit value set by this Inequality (10), then it would be difficult to compensate for the aberrations of an axial bundle of rays and a radial bundle of rays.

If LL/Y were equal to or greater than the upper limit value set by this Inequality (10), then it would be difficult to downsize the imaging optical system.

To enhance the advantage described above, at least one of the conditions expressed by the following Inequalities (10a) and (10b) is preferably satisfied:

$$4.8 < LL/Y \tag{10a}$$

$$LL/Y < 6.2 \tag{10b}$$

To further enhance the advantage described above, at least one of the conditions expressed by the following Inequalities (10c) and (10d) is more preferably satisfied:

$$5.0 < LL/Y \tag{10c}$$

$$LL/Y < 6.0 \tag{10d}$$

Figure 5:
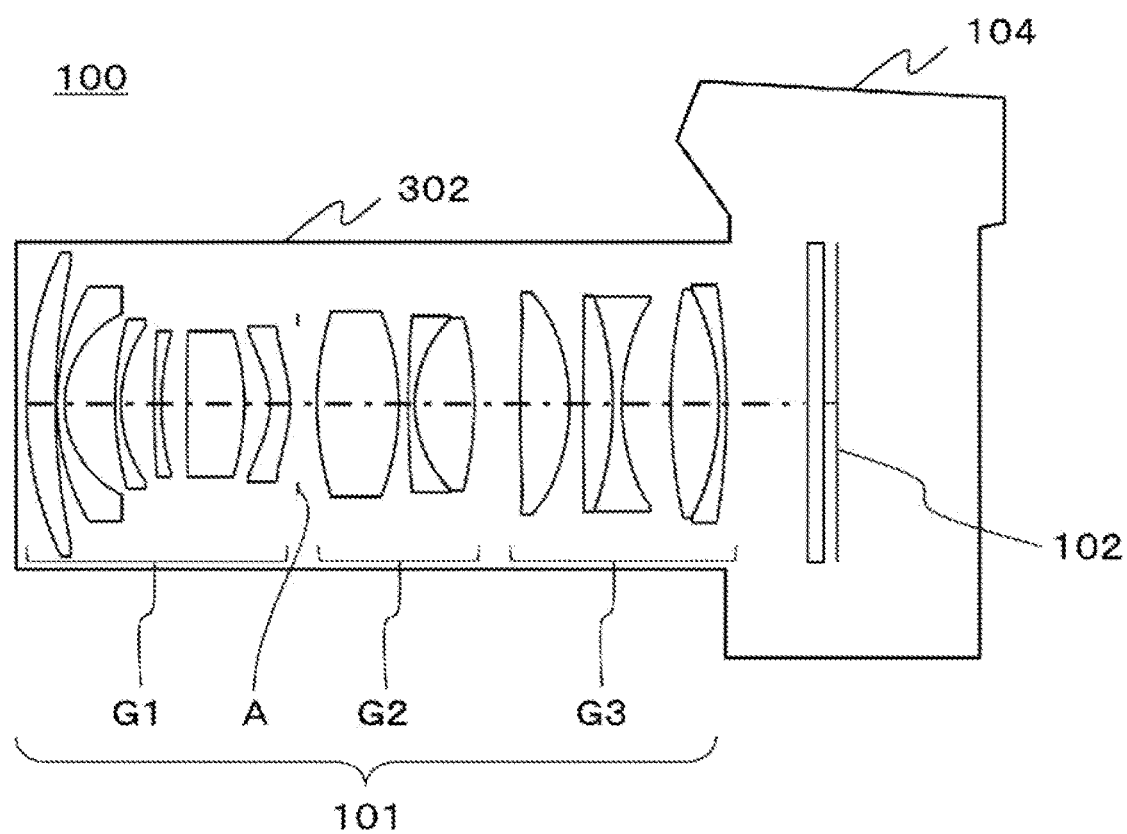
FIG. 5 illustrates a schematic configuration for a digital camera according to the first embodiment.

Schematic Configuration for Image Capture Device to which First Embodiment is Applied FIG. 5 illustrates a schematic configuration for an image capture device, to which the imaging optical system of the first embodiment is applied. Optionally, the imaging optical system according to the second, third, or fourth embodiment is also applicable to the image capture device.

The image capture device 100 includes a housing 104, an image sensor 102, and the imaging optical system 101 according to the first embodiment. Specifically, the image capture device 100 may be implemented as a digital camera, for example.

The housing 104 includes a lens barrel 302. The lens barrel 302 holds the respective lens groups of the imaging optical system 101 and the aperture stop A.

The image sensor 102 is disposed at the image plane S of the imaging optical system 101 according to the first embodiment.

The image capture device 100 transforms an optical image of an object into an electrical image signal and displays and/or stores the image signal thus transformed. The image capture device 100 may include, for example, at least one of a monitor on which the image signal is displayed or a memory that stores the image signal.

The imaging optical system 101 forms an optical image of the object. The image sensor 102 transforms the optical image, formed by the imaging optical system 101, into an electrical image signal.

The imaging optical system 101 is configured such that the first lens group and the third lens group do not move along the optical axis and the second lens group moves along the optical axis. Specifically, to allow the second lens group G2 to move while the imaging optical system 101 is focusing, an actuator and a lens frame, which are included in the housing 104, are attached or coupled to the second lens group G2.

This provides an image capture device 100 with the ability to compensate for various types of aberrations sufficiently.

In the example described above, the imaging optical system 101 according to the first embodiment is applied to a digital camera. However, this is only an example and should not be construed as limiting. Alternatively, the imaging optical system is also applicable to a surveillance camera, a smartphone, or any of various other types of image capture devices.

Figure 6:
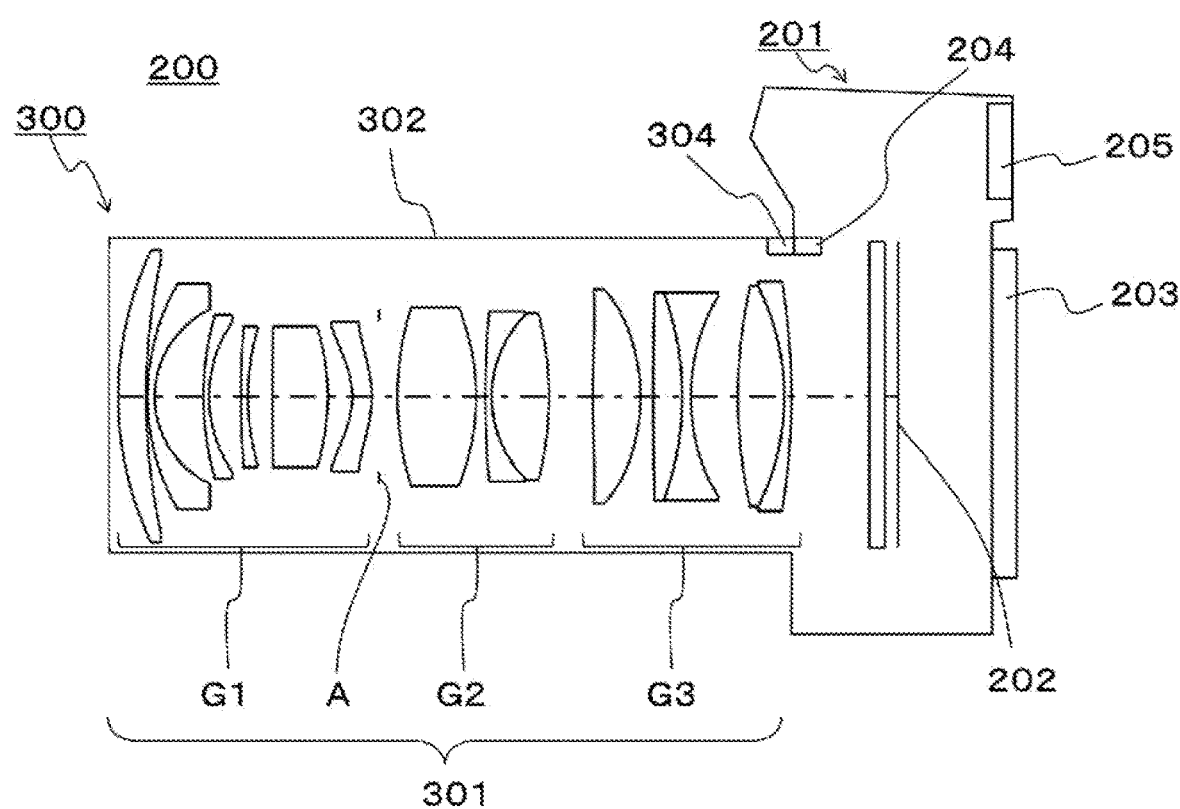
FIG. 6 illustrates a schematic configuration for a lens interchangeable digital camera system according to the first embodiment.

Schematic Configuration for Camera System to which First Embodiment is Applied FIG. 6 illustrates a schematic configuration for a camera system, to which the imaging optical system of the first embodiment is applied. Alternatively, the imaging optical system according to the second, third, or fourth embodiment is also applicable to the camera system.

The camera system 200 includes a camera body 201 and an interchangeable lens unit 300 to be connected removably to the camera body 201.

The camera body 201 includes an image sensor 202, a monitor 203, a memory, a camera mount 204, and a viewfinder 205. The image sensor 202 receives an optical image formed by the imaging optical system 301 of the interchangeable lens unit 300 and transforms the optical image into an electrical image signal. The monitor 203 displays the image signal transformed by the image sensor 202. The memory stores the image signal.

The imaging optical system 301 of the interchangeable lens unit 300 is the imaging optical system according to the first embodiment. The interchangeable lens unit 300 makes the imaging optical system 301 form an optical image of the object on the image sensor 202.

The interchangeable lens unit 300 includes not only the imaging optical system 301 but also a lens barrel 302 and a lens mount 304. The lens barrel 302 holds the respective lens groups and aperture stop A of the imaging optical system 301. The lens mount 304 is configured to be connected removably to the camera mount 204 of the camera body 201.

In this manner, the camera mount 204 and the lens mount 304 are physically connected together. In addition, the camera mount 204 and the lens mount 304 also electrically connect together a controller in the camera body 201 and a controller in the interchangeable lens unit 300. That is to say, the camera mount 204 and the lens mount 304 also serve as interfaces that allow themselves to exchange signals with each other.

The imaging optical system 301 includes the respective lens groups held by the lens barrel 302. The camera body 201 includes cover glass CG. The imaging optical system 301 includes the first lens group G1, the second lens group G2, the aperture stop A, and the third lens group G3. The imaging optical system 301 is configured such that the first lens group G1 and the third lens group G3 do not move along the optical axis and the second lens group G2 moves along the optical axis. Specifically, to allow the second lens group G2 to move while the imaging optical system 301 is focusing, an actuator and a lens frame, which are controlled by the controller in the interchangeable lens unit 300, are arranged.

Other Embodiments

The first, second, third, and fourth embodiments have been described as exemplary embodiments of the present disclosure. Note that the embodiments described above are only examples of the present disclosure and should not be construed as limiting. Rather, each of those embodiments may be readily modified, replaced, combined with other embodiments, provided with some additional components, or partially omitted without departing from the scope of the present disclosure.

In the first to fourth embodiments described above, each of the lens groups that form the imaging optical system is supposed to consist of only refractive lenses that deflect the incoming light ray through refraction (i.e., lenses of the type that deflect the incoming light ray at the interface between two media with mutually different refractive indices). However, this is only an example and should not be construed as limiting. Alternatively, each lens group may also include diffractive lenses that deflect the incoming light ray through diffraction, refractive-diffractive hybrid lenses that deflect the incoming light ray through a combination of diffraction and refraction, or refractive index distributed lenses that deflect the incoming light ray in accordance with the distribution of refractive indices in the medium, or a combination of two or more types of these lenses. Among other things, a diffraction structure is preferably formed at the interface between two media with mutually different refractive indices in the refractive-diffractive hybrid lenses, because the diffraction efficiency would depend on the wavelength much less heavily in that case. This provides a camera system in which various types of aberrations have been compensated for sufficiently.

Examples of Numerical Values

Next, exemplary sets of specific numerical values that were actually adopted in the imaging optical systems with the configurations according to the first, second, third, and fourth embodiments will be described. Note that in the tables showing these exemplary sets of numerical values, the length is expressed in millimeters (mm), the angle of view is expressed in degrees (°), r indicates the radius of curvature, d indicates the surface interval, nd indicates a refractive index in response to a d-line, vd (also denoted as "vd") indicates an Abbe number in response to a d-line, and a surface with an asterisk (*) is an aspheric surface. The aspheric shape is defined by the following Equation (1):

$$Z = \frac{h^2/r}{1 + \sqrt{1 - (1+\kappa)(h/r)^2}} + \sum A_n h^n$$

where Z is the distance from a point on an aspheric surface, located at a height h as measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

FIGS. 1B, 2B, 3B, and 4B are longitudinal aberration diagrams showing what state the imaging optical systems according to the first, second, third, and fourth examples of numerical values assume.

In each longitudinal aberration diagram, portion (a) shows the longitudinal aberrations at the infinity focus point, and portion (b) shows the longitudinal aberrations at the close-object focus point. Each of portions (a) and (b) of these longitudinal aberration diagrams shows spherical aberration (SA (mm)), astigmatism (AST (mm)), and distortion (DIS (%)) in this order from left to right. In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

First Example of Numerical Values

Following is a first exemplary set of numerical values for the imaging optical system corresponding to the first embodiment shown in FIG. 1A. Specifically, as the first example of numerical values for the imaging optical system, surface data is shown in Table 1A, aspheric surface data is shown in Table 1B, various types of data in the infinity in-focus state and close-object in-focus state are shown in Table 1C, data about single lenses is shown in Table 1D, data about lens groups is shown in Table 1E, and data about sub-lens groups is shown in Table 1F.

TABLE 1A (Surface data)

| Surface No. | r | d | nd | vd |
|---|---|---|---|---|
| object surface | ∞ | Variable | | |
| 1 | 48.02990 | 3.90260 | 1.48749 | 70.4 |
| 2 | 90.07930 | 0.20000 | | |
| 3 | 31.97560 | 1.00000 | 1.90043 | 37.4 |
| 4 | 13.55000 | 6.79910 | | |
| 5 | 41.48260 | 0.80000 | 1.49700 | 81.6 |
| 6 | 18.63990 | 4.44080 | | |
| 7 | 120.79970 | 1.00000 | 1.59282 | 68.6 |
| 8 | 35.14370 | 3.41250 | | |
| 9 | 499.20540 | 7.80000 | 1.95375 | 32.3 |
| 10 | −33.60690 | 3.45020 | | |
| 11* | −11.33220 | 2.70000 | 1.58699 | 59.5 |
| 12* | −16.34630 | 1.00000 | | |
| 13 (aperture) | ∞ | 2.60000 | | |
| 14 | 41.54360 | 11.01020 | 1.56732 | 42.8 |
| 15 | −33.22950 | 1.26370 | | |
| 16 | 133.81220 | 0.90000 | 1.90366 | 31.3 |
| 17 | 16.41590 | 0.01000 | 1.56732 | 42.8 |
| 18 | 16.41590 | 7.99730 | 1.55032 | 75.5 |
| 19 | −47.20770 | 6.20950 | | |
| 20* | 163.11930 | 6.65960 | 1.55332 | 71.7 |
| 21* | −26.02830 | Variable | | |
| 22 | 729.23440 | 4.03360 | 1.86966 | 20.0 |
| 23 | −42.41020 | 0.01000 | 1.56732 | 42.8 |
| 24 | −42.41020 | 1.20000 | 1.68948 | 31.0 |
| 25* | 28.69120 | Variable | | |
| 26 | 72.18090 | 6.46010 | 1.49700 | 81.6 |
| 27 | −34.35060 | 0.01000 | 1.56732 | 42.8 |
| 28 | −34.35060 | 1.00000 | 1.92286 | 20.9 |
| 29 | −98.30440 | BF | | |
| Image plane | ∞ | | | |

TABLE 1B (Aspheric surface data)

$11^{th}$ surface

K = −7.45363E−01, A4 = 1.97430E−04, A6 = −3.68772E−07, A8 = 8.10452E−10, A10 = 0.00000E+00

TABLE 1B-continued (Aspheric surface data)

$12^{th}$ surface

K = − 2.30226E−01, A4 = 1.69146E−04, A6 = −1.82702E−07, A8 = 2.57163E−10, A10 = 6.84747E−13

$20^{th}$ surface

K = 0.00000E+00, A4 = −1.56398E−06, A6 = −1.92797E−08, A8 = −2.50221E−10, A10 = 6.56774E−13

$21^{st}$ surface

K = 0.00000E+00, A4 = 1.56292E−05, A6 = −1.22398E−07, A8 = 2.23585E−10, A10 = −5.01208E−13

$25^{th}$ surface

K = 0.00000E+00, A4 = −6.57382E−06, A6 = 1.01928E−07, A8 = −2.92812E−10, A10 = 2.78089E−13

TABLE 1C (Various types of data in infinity in-focus state and close-object in-focus state)

| | Infinity | Close-object |
|---|---|---|
| Focal length | 18.9594 | 17.7150 |
| F number | 2.00002 | 1.96569 |
| Angle of view | 48.7651 | 49.3965 |
| Image height | 19.7160 | 19.4730 |
| Total lens length | 111.0000 | 111.0000 |
| BF | 16.7412 | 16.7412 |
| d0 | ∞ | 89.0000 |
| d21 | 1.8000 | 4.7418 |
| d25 | 6.5896 | 3.6478 |
| Entrance pupil position | 17.3179 | 17.3179 |
| Exit pupil position | −73.0991 | −69.3387 |
| Anterior principal point | 31.3590 | 30.2995 |
| Posterior principal point | 92.0278 | 90.2456 |

TABLE 1D (Data about single lenses)

| Lens | Start surface | Focal length |
|---|---|---|
| 1 | 1 | 204.8325 |
| 2 | 3 | −26.8040 |
| 3 | 5 | −68.9108 |
| 4 | 7 | −83.9694 |
| 5 | 9 | 33.2518 |
| 6 | 11 | −78.5910 |
| 7 | 14 | 34.3749 |
| 8 | 16 | −20.7819 |
| 9 | 18 | 23.1667 |
| 10 | 20 | 41.0824 |
| 11 | 22 | 46.1983 |
| 12 | 24 | −24.6512 |
| 13 | 26 | 47.7922 |
| 14 | 28 | −57.6470 |

TABLE 1E (Data about lens groups)

| Group | Start surface | Focal length | Lens configuration length | Anterior principal point | Posterior principal point |
|---|---|---|---|---|---|
| 1 | 1 | 13.43451 | 73.15550 | 29.43584 | 84.16385 |
| 2 | 22 | −54.21552 | 5.24360 | 3.23993 | 5.59507 |
| 3 | 26 | 250.61044 | 7.47010 | −1.96746 | 0.68617 |

TABLE 1F (Data about sub-lens groups)

| Group | Start surface | Focal length | Lens configuration length |
|---|---|---|---|
| 1A | 1 | −30.499 | 35.505 |
| 1B | 14 | 26.330 | 34.050 |

Second Example of Numerical Values

Following is a second exemplary set of numerical values for the imaging optical system corresponding to the second embodiment shown in FIG. 2A. Specifically, as the second example of numerical values for the imaging optical system, surface data is shown in Table 2A, aspheric surface data is shown in Table 2B, various types of data in the infinity in-focus state and close-object in-focus state are shown in Table 2C, data about single lenses is shown in Table 2D, data about lens groups is shown in Table 2E, and data about sub-lens groups is shown in Table 2F.

TABLE 2A (Surface data)

| Surface No. | r | d | nd | vd |
|---|---|---|---|---|
| object surface | ∞ | Variable | | |
| 1 | 42.84300 | 5.72110 | 1.60000 | 42.5 |
| 2 | 91.95640 | 2.06980 | | |
| 3 | 44.46940 | 1.00000 | 2.00100 | 29.1 |
| 4 | 13.63550 | 5.53030 | | |
| 5 | 25.28320 | 1.00000 | 1.59282 | 68.6 |
| 6 | 15.05210 | 4.41380 | | |
| 7 | 68.24300 | 1.00000 | 1.43700 | 95.1 |
| 8 | 27.06680 | 3.44230 | | |
| 9 | 1022.65510 | 9.12520 | 2.00100 | 29.1 |
| 10 | −30.42900 | 2.62710 | | |
| 11* | −11.03110 | 2.55870 | 1.58699 | 59.5 |
| 12* | −16.57630 | 3.36800 | | |
| 13 (aperture) | ∞ | 3.59010 | | |
| 14 | 38.54240 | 5.87450 | 1.59282 | 68.6 |
| 15 | −38.60030 | 1.61400 | | |
| 16 | 36.04890 | 1.00000 | 1.91082 | 35.2 |
| 17 | 13.72010 | 0.01000 | 1.56732 | 42.8 |
| 18 | 13.72010 | 7.25730 | 1.55032 | 75.5 |
| 19 | −186.98280 | 2.67540 | | |
| 20* | 158.45550 | 4.54960 | 1.55332 | 71.7 |
| 21* | −28.26450 | Variable | | |
| 22* | −40.89690 | 2.84960 | 1.80998 | 40.9 |
| 23* | 312.73810 | Variable | | |
| 24 | 63.04500 | 8.91690 | 1.59282 | 68.6 |
| 25 | −26.28040 | 0.36680 | | |
| 26 | −53.90770 | 3.02320 | 2.00069 | 25.5 |
| 27 | 100.84890 | BF | | |
| Image plane | ∞ | | | |

TABLE 2B (Aspheric surface data)

$11^{th}$ surface

K = −5.81264E−01, A4 = 2.78852E−04, A6 = −8.15421E−07, A8 = 2.88520E−09, A10 = 0.00000E+00

$12^{th}$ surface

K = 8.53914E−02, A4 = 2.30186E−04, A6 = −4.48622E−07, A8 = 7.92008E−10, A10 = 4.32486E−12

$20^{th}$ surface

K = 0.00000E+00, A4 = 2.97924E−05, A6 = −2.50285E−07, A8 = 8.33583E−10, A10 = 5.40636E−13

TABLE 2B-continued (Aspheric surface data)

$21^{st}$ surface

K = 0.00000E+00, A4 = 5.83074E−05, A6 = −5.70200E−07, A8 = 3.18080E−09, A10 = −7.90450E−12

$22^{nd}$ surface

K = −7.54830E−01, A4 = 1.68171E−04, A6 = −8.58948E−07, A8 = 3.60406E−09, A10 = −9.50933E−12

$23^{rd}$ surface

K = 1.00000E+00, A4 = 1.69256E−04, A6 = −3.36321E−07, A8 = 6.04185E−10, A10 = −4.18500E−12

TABLE 2C (Various types of data in infinity in-focus state and close-object in-focus state)

| | Infinity | Close-object |
|---|---|---|
| Focal length | 16.7829 | 15.9313 |
| F number | 1.87709 | 1.87734 |
| Angle of view | 52.1930 | 52.2833 |
| Image height | 19.4960 | 19.6430 |
| Total lens length | 104.5157 | 104.5157 |
| BF | 12.3986 | 12.3986 |
| d0 | ∞ | 95.4843 |
| d21 | 1.9091 | 3.6024 |
| d23 | 6.6243 | 4.9310 |
| Entrance pupil position | 20.1286 | 20.1286 |
| Exit pupil position | −49.6268 | −48.1800 |
| Anterior principal point | 31.2340 | 30.5333 |
| Posterior principal point | 87.7169 | 86.3289 |

TABLE 2D (Data about single lenses)

| Lens | Start surface | Focal length |
|---|---|---|
| 1 | 1 | 128.0978 |
| 2 | 3 | −19.9697 |
| 3 | 5 | −65.1140 |
| 4 | 7 | −103.4155 |
| 5 | 9 | 29.6487 |
| 6 | 11 | −67.7383 |
| 7 | 14 | 33.4808 |
| 8 | 16 | −24.8497 |
| 9 | 18 | 23.5287 |
| 10 | 20 | 43.7289 |
| 11 | 22 | −44.4917 |
| 12 | 24 | 32.4956 |
| 13 | 26 | −34.7655 |

TABLE 2E (Data about lens groups)

| Group | Start surface | Focal length | Lens configuration length | Anterior principal point | Posterior principal point |
|---|---|---|---|---|---|
| 1 | 1 | 11.35206 | 68.42720 | 29.36082 | 77.70190 |
| 2 | 22 | −44.49169 | 2.84960 | 0.18142 | 1.46229 |
| 3 | 24 | 232.04522 | 12.30690 | −13.24139 | −7.22486 |

TABLE 2F (Data about sub-lens groups)

| Group | Start surface | Focal length | Lens configuration length |
|---|---|---|---|
| 1A | 1 | −29.963 | 38.488 |
| 1B | 14 | 22.363 | 22.981 |

Third Example of Numerical Values

Following is a third exemplary set of numerical values for the imaging optical system corresponding to the third embodiment shown in FIG. 3A. Specifically, as the third example of numerical values for the imaging optical system, surface data is shown in Table 3A, aspheric surface data is shown in Table 3B, various types of data in the infinity in-focus state and close-object in-focus state are shown in Table 3C, data about single lenses is shown in Table 3D, data about lens groups is shown in Table 3E, and data about sub-lens groups is shown in Table 3F.

TABLE 3A (Surface data)

| Surface No. | r | d | nd | vd |
|---|---|---|---|---|
| object surface | ∞ | Variable | | |
| 1 | 42.57620 | 5.58870 | 1.58144 | 40.9 |
| 2 | 91.89320 | 2.40260 | | |
| 3 | 46.13430 | 1.00000 | 1.90366 | 31.3 |
| 4 | 14.10420 | 6.17250 | | |
| 5 | 31.89660 | 1.00000 | 1.59282 | 68.6 |
| 6 | 17.26250 | 4.29810 | | |
| 7 | 101.39490 | 1.00000 | 1.43700 | 95.1 |
| 8 | 31.10980 | 3.30940 | | |
| 9 | 527.39980 | 7.01330 | 2.00100 | 29.1 |
| 10 | −34.59410 | 2.81050 | | |
| 11* | −11.20320 | 2.21540 | 1.58699 | 59.5 |
| 12* | −16.01380 | 4.58110 | | |
| 13 (aperture) | ∞ | 2.60000 | | |
| 14 | 50.39140 | 6.19810 | 1.59282 | 68.6 |
| 15 | −34.70470 | 0.50000 | | |
| 16 | 137.44740 | 2.07000 | 1.64769 | 33.8 |
| 17 | 6883.03000 | 0.50000 | | |
| 18 | 69.55890 | 1.00000 | 1.91082 | 35.2 |
| 19 | 15.16550 | 0.01000 | 1.56732 | 42.8 |
| 20 | 15.16550 | 7.77600 | 1.55032 | 75.5 |
| 21 | −89.39850 | 2.13710 | | |
| 22* | 236.82080 | 5.20270 | 1.58699 | 59.5 |
| 23* | −32.71720 | Variable | | |
| 24* | −37.54560 | 3.03990 | 1.58699 | 59.5 |
| 25* | 461.52520 | Variable | | |
| 26 | 68.75170 | 8.11870 | 1.59349 | 67.0 |
| 27 | −28.83130 | 0.37110 | | |
| 28 | −56.19360 | 1.39440 | 1.84666 | 23.8 |
| 29 | 120.68540 | BF | | |
| Image plane | ∞ | | | |

TABLE 3B (Aspheric surface data)

11$^{th}$ surface

K = −8.79475E−01, A4 = 2.49983E−04, A6 = −9.14352E−07,
A8 = 2.48418E−09, A10 = 0.00000E+00

12$^{th}$ surface

K = 1.10160E−01, A4 = 2.41660E−04, A6 = −5.00473E−07,
A8 = 7.68041E−10, A10 = 4.63103E−12

TABLE 3B-continued (Aspheric surface data)

22$^{nd}$ surface

K = 0.00000E+00, A4 = 1.93299E−05, A6 = −1.37964E−07,
A8 = 4.59455E−10, A10 = 3.25229E−13

23$^{rd}$ surface

K = 0.00000E+00, A4 = 2.70521E−05, A6 = −2.54348E−07,
A8 = 1.17625E−09, A10 = −2.40687E−12

24$^{th}$ surface

K = 2.67092E−01, A4 = 1.51171E−04, A6 = −6.95355E−07,
A8 = 2.31329E−09, A10 = −4.60797E−12

25$^{th}$ surface

K = 1.00000E+00, A4 = 1.52464E−04, A6 = −3.66743E−07,
A8 = 3.63255E−10, A10 = −6.45997E−13

TABLE 3C (Various types of data in infinity in-focus state and close-object in-focus state)

| | Infinity | Close-object |
|---|---|---|
| Focal length | 19.1747 | 18.2233 |
| F number | 1.87714 | 1.88667 |
| Angle of view | 48.4450 | 48.4320 |
| Image height | 19.4940 | 19.7910 |
| Total lens length | 110.000 | 110.000 |
| BF | 18.8000 | 18.8000 |
| d0 | ∞ | 90.0000 |
| d23 | 1.8736 | 4.7633 |
| d25 | 7.0167 | 4.1271 |
| Entrance pupil position | 21.7082 | 21.7082 |
| Exit pupil position | −65.0813 | −62.0806 |
| Anterior principal point | 35.2323 | 34.3029 |
| Posterior principal point | 90.8112 | 88.6966 |

TABLE 3D (Data about single lenses)

| Lens | Start surface | Focal length |
|---|---|---|
| 1 | 1 | 130.9848 |
| 2 | 3 | −22.8189 |
| 3 | 5 | −65.1245 |
| 4 | 7 | −103.1456 |
| 5 | 9 | 32.6358 |
| 6 | 11 | −76.5786 |
| 7 | 14 | 35.6324 |
| 8 | 16 | 216.5096 |
| 9 | 18 | −21.4809 |
| 10 | 20 | 24.1995 |
| 11 | 22 | 49.3242 |
| 12 | 24 | −59.0184 |
| 13 | 26 | 35.3206 |
| 14 | 28 | −45.1219 |

TABLE 3E (Data about lens groups)

| Group | Start surface | Focal length | Lens configuration length | Anterior principal point | Posterior principal point |
|---|---|---|---|---|---|
| 1 | 1 | 14.29688 | 69.38550 | 32.72855 | 81.19100 |
| 2 | 24 | −59.01837 | 3.03990 | 0.14378 | 1.27247 |
| 3 | 26 | 133.20119 | 9.88420 | −2.68255 | 1.21158 |

TABLE 3F (Data about sub-lens groups)

| Group | Start surface | Focal length | Lens configuration length |
|---|---|---|---|
| 1A | 1 | −30.626 | 36.810 |
| 1B | 14 | 24.833 | 25.394 |

Fourth Example of Numerical Values

Following is a fourth exemplary set of numerical values for the imaging optical system corresponding to the fourth embodiment shown in FIG. 4A. Specifically, as the fourth example of numerical values for the imaging optical system, surface data is shown in Table 4A, aspheric surface data is shown in Table 4B, various types of data in the infinity in-focus state and close-object in-focus state are shown in Table 4C, data about single lenses is shown in Table 4D, data about lens groups is shown in Table 4E, and data about sub-lens groups is shown in Table 4F.

TABLE 4A (Surface data)

| Surface No. | r | d | nd | vd |
|---|---|---|---|---|
| object surface | ∞ | Variable | | |
| 1 | 272.77660 | 2.27600 | 1.95375 | 32.3 |
| 2 | 1000.00000 | 0.30000 | | |
| 3 | 41.78350 | 1.20000 | 1.87071 | 40.7 |
| 4 | 16.80220 | 5.47960 | | |
| 5 | 27.33780 | 1.00000 | 1.59282 | 68.6 |
| 6 | 18.70640 | 5.87180 | | |
| 7 | 425.56620 | 1.00000 | 1.49700 | 81.6 |
| 8 | 27.14620 | 3.50000 | | |
| 9 | 43.03520 | 7.00000 | 2.00069 | 25.5 |
| 10 | −672.96660 | 5.01340 | | |
| 11* | −25.84140 | 2.79080 | 1.80998 | 40.9 |
| 12* | −40.09030 | 2.30130 | | |
| 13 (aperture) | ∞ | 3.18460 | | |
| 14 | −455.72710 | 5.87030 | 1.59282 | 68.6 |
| 15 | −22.05740 | 0.50000 | | |
| 16 | 27.22690 | 1.00000 | 2.00100 | 29.1 |
| 17 | 19.94100 | 0.01000 | 1.56732 | 42.8 |
| 18 | 19.94100 | 9.76400 | 1.49700 | 81.6 |
| 19 | −32.98590 | 0.50000 | | |
| 20 | 67.56620 | 1.00000 | 1.90366 | 31.3 |
| 21 | 21.12240 | Variable | | |
| 22* | 26.53590 | 5.30860 | 1.77200 | 50.0 |
| 23* | 60.50370 | Variable | | |
| 24* | −269.07620 | 2.50000 | 1.80998 | 40.9 |
| 25* | 1030.79290 | 5.86550 | | |
| 26 | 134.91120 | 4.00000 | 1.49700 | 81.6 |
| 27 | 219.12370 | BF | | |
| Image plane | ∞ | | | |

TABLE 4B (Aspheric surface data)

11$^{th}$ surface

K = 1.00000E+00, A4 = 1.10368E−04, A6 = −1.04634E−07, A8 = −1.61096E−09, A10 = 5.71498E−12

12$^{th}$ surface

K = −6.79439E−01, A4 = 1.10227E−04, A6 = 1.00898E−09, A8 = −1.82810E−09, A10 = 4.75696E−12

22$^{nd}$ surface

K = 0.00000E+00, A4 = 7.12261E−06, A6 = −4.38761E−09, A8 = −7.12650E−11, A10 = 1.28777E−12

TABLE 4B-continued (Aspheric surface data)

23$^{rd}$ surface

K = 0.00000E+00, A4 = 9.88357E−06, A6 = −6.79134E−08, A8 = 4.46782E−10, A10 = 8.97688E−13

24$^{th}$ surface

K = 0.00000E+00, A4 = 1.13963E−04, A6 = −2.45687E−07, A8 = 1.09709E−09, A10 = −2.30038E−12

25$^{th}$ surface

K = 0.00000E+00, A4 = 1.23599E−04, A6 = −8.43234E−08, A8 = 6.91081E−10, A10 = −1.83371E−12

TABLE 4C (Various types of data in infinity in-focus state and close-object in-focus state)

| | Infinity | Close-object |
|---|---|---|
| Focal length | 20.0900 | 19.4230 |
| F number | 1.87727 | 1.94504 |
| Angle of view | 47.1128 | 46.2411 |
| Image height | 19.5860 | 20.4500 |
| Total lens length | 103.2415 | 103.2415 |
| BF | 18.5000 | 18.5000 |
| d0 | ∞ | 96.7584 |
| d21 | 5.4089 | 1.7517 |
| d23 | 2.0967 | 5.7538 |
| Entrance pupil position | 17.2501 | 17.2501 |
| Exit pupil position | −57.6613 | −54.9238 |
| Anterior principal point | 30.3367 | 29.3389 |
| Posterior principal point | 83.1211 | 80.3322 |

TABLE 4D (Data about single lenses)

| Lens | Start surface | Focal length |
|---|---|---|
| 1 | 1 | 392.6835 |
| 2 | 3 | −33.0145 |
| 3 | 5 | −104.4454 |
| 4 | 7 | −58.3906 |
| 5 | 9 | 40.6191 |
| 6 | 11 | −98.3871 |
| 7 | 14 | 38.9038 |
| 8 | 16 | −79.9316 |
| 9 | 18 | 26.6375 |
| 10 | 20 | −34.3560 |
| 11 | 22 | 57.3226 |
| 12 | 24 | −263.2084 |
| 13 | 26 | 695.3631 |

TABLE 4E (Data about lens groups)

| Group | Start surface | Focal length | Lens configuration length | Anterior principal point | Posterior principal point |
|---|---|---|---|---|---|
| 1 | 1 | 45.21174 | 59.56180 | 41.53237 | 98.25509 |
| 2 | 22 | 57.32262 | 5.30860 | −2.19117 | 0.31257 |
| 3 | 24 | −426.22620 | 12.36550 | −1.39730 | 1.07457 |

TABLE 4F (Data about sub-lens groups)

| Group | Start surface | Focal length | Lens configuration length |
|---|---|---|---|
| 1A | 1 | −24.694 | 35.432 |
| 1B | 14 | 33.702 | 18.644 |

(Values Corresponding to Inequalities)

Values, corresponding to the Inequalities (1) to (10), of the respective examples of numerical values are shown in the following Table 5:

TABLE 5

| Condition | | 1st example of numerical values | 2nd example of numerical values | 3rd example of numerical values | 4th example of numerical values |
|---|---|---|---|---|---|
| BF/Y | (1) | 0.38 | 0.24 | 0.38 | 0.34 |
| νd_L1A3 | (2) | 81.61 | 68.62 | 68.62 | 68.62 |
| ΔPgF_L1A3 | (3) | 0.037 | 0.019 | 0.019 | 0.019 |
| νd_L1A4 | (4) | 68.62 | 95.10 | 95.10 | 81.61 |
| ΔPgF_L1A4 | (5) | 0.019 | 0.056 | 0.056 | 0.037 |
| f_L1A1/f | (6) | 10.8 | 7.63 | 6.83 | 19.54 |
| ENP/f | (7) | 0.91 | 1.20 | 1.13 | 0.86 |
| nd_L1Ap | (8) | 1.954 | 2.001 | 2.001 | 2.001 |
| |f2/f| | (9) | 2.86 | 2.65 | 2.87 | 2.85 |
| LL/Y | (10) | 5.63 | 5.36 | 5.64 | 5.27 |

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

INDUSTRIAL APPLICABILITY

The imaging optical system according to the present disclosure is applicable to various types of cameras including digital still cameras, lens interchangeable digital cameras, digital camcorders, cameras for cellphones and smartphones, and cameras for personal digital assistants (PDAs), surveillance cameras for surveillance systems, Web cameras, and onboard cameras. Among other things, the present disclosure is particularly effectively applicable as an imaging optical system for digital still camera systems, digital camcorder systems, and other camera systems that require high image quality.

The invention claimed is:

1. An imaging optical system consisting of:
a first lens group having positive power;
a second lens group having power; and
a third lens group having power,
the first lens group, the second lens group, and the third lens group being arranged in this order such that the first lens group is located closer to an object than any other lens group of the imaging optical system is,
the first lens group and the third lens group being immobile along an optical axis with the second lens group moving along the optical axis, while the imaging optical system is focusing to make a transition from an infinity in-focus state toward a close-object in-focus state,
the first lens group consisting of:
a sub-lens group G1A;
an aperture stop; and
a sub-lens group G1B,
the sub-lens group G1A, the aperture stop, and the sub-lens group G1B being arranged in this order such that the sub-lens group G1A is located closer to the object than the aperture stop or the sub-lens group G1B is,
the sub-lens group G1A including, as a plurality of lenses:
a meniscus lens L1A1 having positive power, having a convex surface facing the object, and disposed closest to the object in the plurality of lenses;
a meniscus lens L1A2 having negative power, having a convex surface facing the object, and disposed second closest to the object in the plurality of lenses; and
a meniscus lens L1A3 having negative power, having a convex surface facing the object, and disposed third closest to the object in the plurality of lenses,
the imaging optical system satisfying the following Inequality (1):

$$0.3 < BF/Y < 1.2 \tag{1}$$

where BF is a back focus of the imaging optical system, and Y is an image height of the imaging optical system in the infinity in-focus state.

2. The imaging optical system of claim 1, wherein the imaging optical system satisfies the following Inequalities (2) and (3):

$$\nu d\_L1A3 > 60 \tag{2}$$

$$0.010 < \Delta PgF\_L1A3 \tag{3}$$

where νd_L1A3 is an Abbe number of the meniscus lens L1A3 in response to a d-line, and
ΔPgF_L1A3 is a degree of anomalous dispersion of the meniscus lens L1A3 in response to a g-line and an F-line.

3. The imaging optical system of claim 1, wherein the sub-lens group G1A further includes a lens L1A4 disposed fourth closest to the object in the plurality of lenses, and
the imaging optical system satisfies the following Inequalities (4) and (5):

$$\nu d\_L1A4 > 60 \tag{4}$$

$$0.010 < \Delta PgF\_L1A4 \tag{5}$$

where νd_L1A4 is an Abbe number of the lens L1A4 in response to a d-line, and
ΔPgF_L1A4 is a degree of anomalous dispersion of the lens L1A4 in response to a g-line and an F-line.

4. The imaging optical system of claim 1, wherein the imaging optical system satisfies the following Inequality (6):

$$1 < f\_L1A1/f < 30 \tag{6}$$

where f_L1A1 is a focal length of the meniscus lens L1A1, and
f is a focal length of the imaging optical system in the infinity in-focus state.

5. The imaging optical system of claim 1, wherein the imaging optical system satisfies the following Inequality (7):

$$0.5 < ENP/f < 1.5 \tag{7}$$

where ENP is a distance on the optical axis from a lens surface closest to the object in the imaging optical system to an entrance pupil position, and f is a focal length of the imaging optical system in the infinity in-focus state.

6. The imaging optical system of claim 1, wherein the sub-lens group G1A further includes a biconvex lens, and the imaging optical system satisfies the following Inequality (8):

$$1.85 < nd\_L1Ap \tag{8}$$

where $nd\_L1Ap$ is a refractive index of the biconvex lens in response to a d-line.

7. The imaging optical system of claim 1, wherein the imaging optical system satisfies the following Inequality (9):

$$1.5 < |f2/1| < 3.5 \tag{9}$$

where f2 is a focal length of the second lens group, and
f is a focal length of the imaging optical system in the infinity in-focus state.

8. The imaging optical system of claim 1, wherein the imaging optical system satisfies the following Inequality (10):

$$4.5 < LL/Y < 6.5 \tag{10}$$

where LL is a total optical length of the imaging optical system in the infinity in-focus state, and
Y is a maximum image height of the imaging optical system in the infinity in-focus state.

9. A camera system comprising:

an interchangeable lens unit including the imaging optical system of claim 1; and a camera body including: an image sensor configured to receive an optical image formed by the imaging optical system and transform the optical image into an electrical image signal; and a camera mount, the camera body being configured to be connected removably to the interchangeable lens unit via the camera mount, the interchangeable lens unit forming the optical image of the object on the image sensor.

10. An image capture device configured to transform an optical image of an object into an electrical image signal and display and/or store the electrical image signal transformed, the image capture device comprising:

the imaging optical system of claim 1 configured to form the optical image of the object; and an image sensor configured to transform the optical image formed by the imaging optical system into the electrical image signal.

* * * * *